(12) United States Patent
Duffy

(10) Patent No.: US 7,828,545 B2
(45) Date of Patent: Nov. 9, 2010

(54) APPARATUS AND METHOD FOR PRODUCING STRUCTURES WITH MULTIPLE UNDERCUT STEMS

(76) Inventor: Leonard Arnold Duffy, P.O. Box 99, Hinesburg, VT (US) 05461

( * ) Notice: Subject to any disclaimer, the term of this patent is extended or adjusted under 35 U.S.C. 154(b) by 361 days.

(21) Appl. No.: 11/879,169

(22) Filed: Jul. 16, 2007

(65) Prior Publication Data

US 2008/0018025 A1    Jan. 24, 2008

Related U.S. Application Data

(63) Continuation-in-part of application No. 10/015,087, filed on Oct. 19, 2001, now Pat. No. 7,246,416.

(51) Int. Cl.
A23P 1/00 (2006.01)
B28B 7/20 (2006.01)
B29B 7/00 (2006.01)

(52) U.S. Cl. .................... 425/542; 264/318; 264/328.1; 425/DIG. 58

(58) Field of Classification Search ................ 264/318, 264/319, 325, 28.1; 425/574, 308, 335, 352, 425/356, 363, 542, DIG. 58
See application file for complete search history.

(56) References Cited

U.S. PATENT DOCUMENTS

| | | | |
|---|---|---|---|
| 299,982 A | 6/1884 | Hodgson | |
| 3,147,528 A | 9/1964 | Erb | |
| 3,758,657 A | 9/1973 | Menzin | |
| 4,183,121 A | 1/1980 | Cousins | |
| 4,581,792 A | 4/1986 | Spier | |
| 4,775,310 A | 10/1988 | Fisher | |
| 4,780,256 A * | 10/1988 | Sasaki et al. | 264/40.1 |
| 4,862,563 A | 9/1989 | Flynn | |
| 5,067,210 A | 11/1991 | Kayaki | |
| 5,212,853 A | 5/1993 | Kaneko | |
| 5,242,649 A | 9/1993 | Yamamoto et al. | |
| 5,368,549 A | 11/1994 | McVicker | |
| 5,378,522 A | 1/1995 | Lagomarsino | |
| 5,393,475 A * | 2/1995 | Murasaki et al. | 264/167 |
| 5,460,769 A | 10/1995 | Kaneko | |
| 5,640,744 A | 6/1997 | Allan | |
| 5,656,226 A | 8/1997 | McVicker | |
| 5,799,378 A | 9/1998 | Gershenson | |
| 5,913,482 A * | 6/1999 | Akeno | 24/452 |
| 5,953,797 A | 9/1999 | Provost | |
| 5,983,467 A | 11/1999 | Duffy | |
| 6,000,106 A | 12/1999 | Kampfer | |
| 6,054,091 A | 4/2000 | Miller | |

(Continued)

OTHER PUBLICATIONS

U.S. Appl. No. 10/015,087, filed Apr. 24, 2003, Duffy.

(Continued)

Primary Examiner—Christina Johnson
Assistant Examiner—Elizabeth Royston

(57) ABSTRACT

A method is disclosed for producing structures having a plurality of stems extending away from a fenestrated base to undercut ends. Such structures include slidingly-engaging fastener portions, hook-and-loop hook portions, self-engaging fastener portions, and other structures with similar aspects. The method includes providing a set of partially bypassing dies to define a fenestrated common cavity contiguous with pluralities of undercut stem chambers, filling the cavity with a moldable material, and ejecting the resultant product. The resultant product includes a plurality of undercut stems spaced away from a base with undersides projecting over fenestrations in the base.

26 Claims, 17 Drawing Sheets

U.S. PATENT DOCUMENTS

| | | |
|---|---|---|
| 6,187,247 B1 | 2/2001 | Buzzell |
| 6,224,364 B1 | 5/2001 | Harvey |
| 6,248,276 B1 | 6/2001 | Parellada |
| RE37,338 E | 8/2001 | McVicker |
| 6,678,924 B2 | 1/2004 | Murasaki |

OTHER PUBLICATIONS

U.S. Appl. No. 11/076,489, filed Sep. 15, 2005, Duffy.
U.S. Appl. No. 60/551,757, Duffy.

* cited by examiner

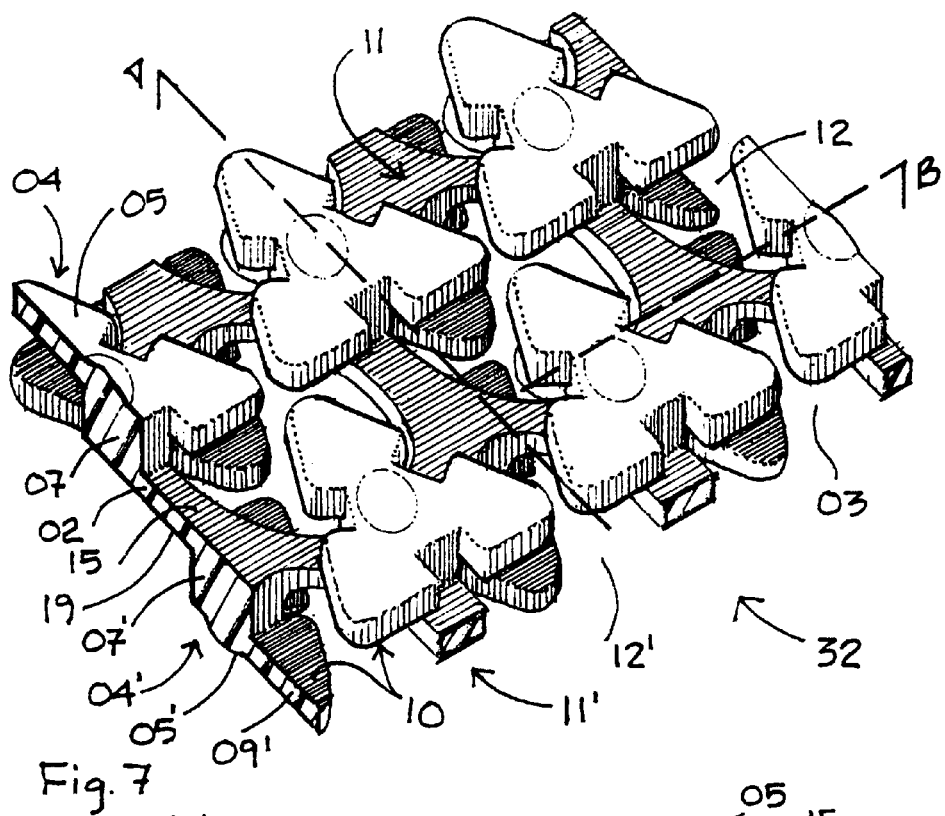
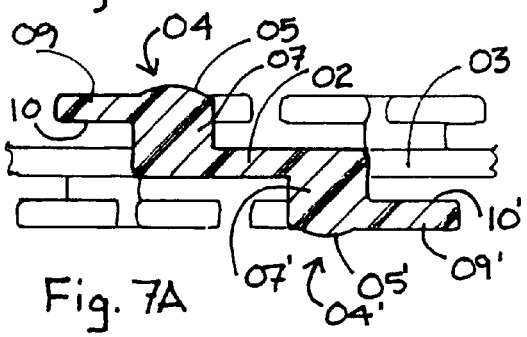
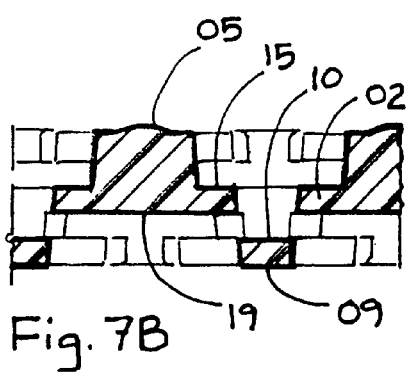

APPARATUS AND METHOD FOR PRODUCING STRUCTURES WITH MULTIPLE UNDERCUT STEMS

This application claims the benefit of, and is a continuation in part of U.S. Utility patent application Ser. No. 10/015,087, filed Oct. 19, 2001, entitled "Improved Slidingly engageable Fasteners and Method of Manufacturing Same", now U.S. Pat. No. 7,246,416; and also claims the benefit of U.S. Utility patent application Ser. No. 11/076,489, filed Mar. 9, 2005, entitled "Molded Surface Fasteners and Attachment Methods", now U.S. Pat. No. 7,254,874, which claims the benefit of Provisional U.S. Application No. 60/551,757 filed Mar. 10, 2004, entitled "Surface Fasteners and Methods".

RELATED APPLICATIONS

This application is also related to U.S. patent application Ser. No. 11/364,929 entitled "Unitary Wrap" filed Mar. 1, 2006.

FIELD OF INVENTION

This application is related to methods of producing Slidingly Engageable Fasteners of types disclosed in U.S. Pat. No. 5,983,467 and U.S. application Ser. No. 10/015,087, as well as hook-and-loop Hook portions and Self-Engaging fasteners of types disclosed in U.S. application Ser. No. 11/076,489. It is also related to methods of producing surface fasteners and other structures of diverse types having pluralities of undercut stems with effectively "blind" undersides extending away from a common base structure and generally oriented toward one or both sides of the common base structure.

BACKGROUND

Products having a multiplicity of undercut stem-like elements with "blind" undersides oriented toward a common base structure require a beneficial and economical method of manufacture. In particular, surface fasteners of the slidingly-engaging type, as well as those of the hook-and-loop type or self-engaging "mushroom" type, and other products having a multitude of relatively small undercut stems can be beneficially manufactured by an economical method which allows precise formation of the undercut elements, and which can also be used to produce such structures as an integral surface feature of a product or product component. Because these types of structures include pluralities of many such relatively small undercut elements, traditional methods of manufacture have proven to be inadequate, particularly with respect to integrating such manufacturing methods into the production of larger components. Therefore, such devices are typically produced as a separate distinct product which then must be attached to a primary product by adhesives or other means, thereby adding assembly cost and bulk to the final product and incurring costs and reliability issues associated with assembly.

Surface Fasteners of the Slidingly Engageable type (SEFs) were disclosed in U.S. Pat. No. 5,983,467 entitled "Interlocking Device" by the undersigned. That disclosure included a range of fastener types, each including portions with a base structure having pluralities of apertures and islands, which may be slidingly engaged by application of a relative shearing force, so that the individual islands of one portion become interlocked within complementary apertures of the other, and vice versa. SEFs may be provided in various designs including uni-directional or multi-directional orientations; may be hermaphroditic or have different male and female portions; may be configured to connect a point, an edge, a strap, a surface or other condition; may include an associated aperture opening that provides a "snap fit" prior to engagement; and may also include diverse self-alignment and coupling mechanisms.

Typically, the individual apertures of Slidingly Engageable Fasteners are designed to receive complementary islands so as to allow a relatively loose and imprecise initial alignment to result in a relatively tight and more precise engaged state, after application of a relative shearing force. Three characteristics define this aspect. First, the apertures and complementary islands are effectively tapered in at least one dimension in relation to the axis of engagement so as to provide an aperture opening that is somewhat larger in at least one dimension than the leading edge of an associated island, thereby abetting self-alignment of the elements. Secondly, each such aperture includes at least one undercut wall segment which, after application of the relative shearing force (i.e. a force applied to one of the portions in a direction generally parallel with the basal surface) to the aligned portions, engages a complementary island undercut sidewall segment so as to contain the island and prevent further movement in a direction generally perpendicular to the basal surface (vertical). Thirdly, each such aperture also includes wall segments which, upon application of the relative shearing force, engage complementary island sidewall segments so as to contain such island and prevent further movement in the direction of such applied shearing force (engagement direction) or in a direction generally perpendicular to such force and also parallel with the basal surface (lateral direction). The term "slidingly engaged" is intended to convey that the islands are caused (by the relative shearing force) to enter complementary apertures so that the island sidewalls progressively approach aperture walls until reaching a state of full contact and engagement, in which state the portions are effectively interlocked.

The profile shape of such walls and sidewalls (as viewed in cross section perpendicular to the axis of engagement), as illustrated in U.S. Pat. No. 5,983,467 include orthogonal dovetail-like shapes, ogee-like shapes, and variations of such shapes. It is apparent that any profile shape which provides the appropriate engagement and containment aspects as described above may be used. It may also be understood that any such walls or sidewalls need not be contiguous in order to provide such engagement and containment aspects. Therefore it has become known to the present inventor that Slidingly Engageable Fasteners may include elements which are discontinuous, perforated, or otherwise modified in design, provided only that the essential function and structural integrity of the device is maintained. In that a basic engineering design precept entails minimizing resources in order to achieve a particular function, it may therefore be desirable to produce Improved SEFs with such discontinuity, perforations or other modifications in order to minimize such resources.

SEFs can provide significant advantages over hook-and-loop, mushroom-type and other surface fasteners, as well as a wide variety of mechanical fastening devices, for many applications. Such advantages include superior shear and tensile strength, low profile, ease of use, durability, a non-grabbing texture, and numerous other aspects. However, in order to advantageously provide these advantages, a simple and economical method of producing SEF fasteners in large or small quantities, in a variety of materials, and in a range of designs is needed.

In addition to the need for an improved method of production, a number of potential improvements to such fasteners are also desirable which may also be related to such method of production. Slidingly Engageable Fasteners should be available in a variety of materials including molded thermoplastics, other moldable materials, paper and paper board, composite and fibrous materials, and in formed metals, plastics and other malleable materials. Flexibility of the overall structure should be combined with structural integrity of individual fastening elements. SEF products should be available in a range of scales for a diversity of applications. Use and disposition of materials should be economical. Low profile and high strength aspects should be maximized. Fastener portions for many potential application environments should be self-cleaning. Self connecting fasteners in strap or linear forms should be available, including double-sided fastener straps and surfaces. Provisions for integrally attaching SEFs to various substrates should be available. SEF portions which may be integrally molded or formed as part of a larger component or product are also needed. Fasteners which combine certain of these aspects as well as other features are also needed.

Working prototypes of SEFs in various embodiments have been produced by molding, machining, forming, constructing, and die cutting diverse materials such as hard and soft plastics, wood, paper and paperboard, foam, sheet metal, ceramic materials, and composite materials. Although these models have generally been functionally successful, the need for a simple and inexpensive method of production is apparent. Molding or forming SEF fastener portions by conventional methods is complicated by the fact that such fasteners include a multiplicity of undercut surfaces. Although conventional molding or forming techniques may be employed to produce various unidirectional SEFs, multi-directional embodiments present a particular challenge. Therefore, a relatively simple method is needed which will provide for the removal of that part of the die or mold which defines the underside of such undercut surfaces without harming, weakening, or compromising the design of the product.

Several known manufacturing processes are applicable to the present invention: injection molding utilizing a reciprocating machine; continuous molding in which a substance is molded between a set of counter rotating rollers, effectively extruding a continuous product; die forming utilizing a reciprocating press; and continuous die forming in which a sheet of material is formed between a set of rotating dies. Each of these processes has been developed extensively over many years, and are not claimed herein except in relation to the present invention. Each such process also involves numerous secondary systems for pressurizing, heating, cooling, lubricating, ejecting product and waste, and other considerations which are beyond the scope of this disclosure. The common aspects of these processes are that each utilize a set of dies or, more commonly, a single die with a corresponding anvil or backing, and an apparatus designed to provide pressure on a raw material in order to produce a product of the desired shape.

Reclosable surface fasteners such as molded hook-and-loop hookstrips and mushroom type fasteners, which also include undercut surface segments, are typically manufactured of molded thermoplastics. Erb U.S. Pat. No. 3,147,528 describes a method of producing hookstrips by reciprocal injection molding. Other methods utilize a continuous web process using a belt or rotary mold. Undercut fastening elements may be formed by a complex mold with internally moving elements i.e. Menzin et al U.S. Pat. No. 3,758,657; they may be directly molded in cavities provided in such a mold and rapidly cooled before forcibly (resiliently) stripping from the mold i.e. Fischer U.S. Pat. No. 4,775,310; or they may be formed in a two step process in which a base with an array of stems is first molded and the stems are subsequently reformed into hooks or mushroom shapes, i.e. Provost et al U.S. Pat. No. 5,953,797.

Yet another possible manufacturing method includes a sacrificial mold portion for forming undercuts, i.e. Torigoe et al U.S. Pat. No. 5,242,649. Recently, Kampfer et al U.S. Pat. No. 6,000,160, Miller U.S. Pat. No. 6,054,091, and Parellada et al U.S. Pat. No. 6,248,276, each disclose improved methods of forming fastener elements by the aforementioned two step process. Many other examples provide variations and refinements to similar processes. It appears that the quest for a definitive method of manufacturing fastener products is ongoing.

Utilizing a set of interengaging dies is a known method of manufacturing complex products with under-surfaces, most commonly known in paper and sheet metal stamping at least as far back as Hodgson U.S. Pat. No. 299,982 of 1884, but also employed in plastic molding. Methods of producing certain designs of hook-and-loop hookstrips and mushroom type fasteners by utilizing an apparatus which includes a set of bypassing dies are also known. Kaneko U.S. Pat. No. 5,212,853 discloses injection molded surface fastener products that utilize a set of male and female interdigitating dies to form a unique mushroom-type fastener portion, although such method is not claimed. Kaneko's product includes a fastener head on two legs which are flush with the head perimeter, apparently to provide flexibility. Kaneko's U.S. Pat. No. 5,460,769 discloses his method which comprises multiple male (core) die segments associated with each fastening element (stem/mushroom), thereby limiting the scale of practical production in that the male segments must be of a practical minimum size compatible with available technologies. His method includes a set of male and female dies with abutment faces, such faces being more or less perpendicular to the product surface structure. Although it is noted that the abutment faces are slightly tapered to facilitate die separation, it would appear that, without further remedy, repetitive use under heat and pressure could cause die seizure or differential movement if anything other than small portions are produced. Like other types of mushroom fasteners, Kaneko's device appears to be limited in potential strength as related to durability under repetitive use. Kayaki U.S. Pat. No. 5,067,210 appears to depend on a similar molding method which is not described. His device appears to require relatively exact positioning in two dimensions, first to align the ribs then to align alternately offset elements. It is apparent that each such fastener has limited application.

Certain other known fasteners also include a fenestrated base structure which could be produced by a method incorporating bypassing dies. Spier, U.S. Pat. No. 4,581,792, describes a press-together surface fastener comprising a plurality of perpendicular tapered projections and complementary receptacles arrayed in alternating rows each surrounded by a contiguous base structure having openings at each such projection and receptacle. Spier's device, however, appears to maintain engagement by friction rather than providing any type of interlock. It requires precise alignment of the portions, and does not appear to provide significant resistance to shear. Cousins, U.S. Pat. No. 4,183,121, and Allan, U.S. Pat. No. 5,640,744, each disclose types of surface fasteners with undercut elements which include portions having a fenestrated base structure, an engagement mechanism which may be effected by a relative shearing force, and in which openings in the fenestrated base structure at least partially align with undersurface segments of individual engagement members. However, each of these fastening devices appear to require considerable precision in aligning the elements both lineally in columns and in angular orientation. The former, Cousins, appears to require consistent pressure along the length of its axis in order to engage all elements simultaneously, and does not provide for excess overlap when adjusted. The latter, Allan, also requires longitudinal alignment ribs to prevent lateral disengagement. Both provide fastening mechanisms which are not adaptable to resist shear forces oriented in more than a single radial direction and have other limitations.

Gershenson U.S. Pat. No. 5,799,378 discloses an apparently injection molded fastening system with superficial similarities to embodiments disclosed by the applicant. However, one of several significant distinctions is that Gershenson's device includes undercut segments effectively coplanar with the surface of the base structure, not extended away on stems; therefore the device appears to be manufactured by a set of dies meeting at an effective common parting line generally aligned with the base structure surface and undersides.

A new manufacturing method for SEFs should include certain desirable aspects. For instance, having a positive means of defining the thickness of a fastener portion throughout its area is particularly important for producing wide products with either reciprocating or rotating molding systems. Provisions for maximizing production speed are also desirable. Providing enhanced surface features for functional, aesthetic, or identification purposes is also desirable. Precise definition of the shape of individual fastening elements is important in controlling the design of strength and release characteristics. Material efficiency, weight, and flexibility should be carefully designed. Strength of individual fastening elements and profile depth require precise control. Speed, simplicity, and economy of production are important considerations as well are tooling costs. Provision of a method by which fastener portions may be readily manufactured in a one-step process as part of a larger primary product would also have significant utility. In summary, there is a need for a simple, efficient, economical, precise, and versatile method of manufacturing Slidingly Engageable Fastening products.

Likewise, a new manufacturing method for producing hook-and-loop hook portions, self engaging "mushroom-like" fasteners, or other structures with multiple undercut stem-like elements should include similar attributes. Such devices produced as distinct products for stand-alone or attached applications can be enhanced by greater material efficiency, reduced weight, improved flexibility, production precision, and manufacturing speed and efficiency by such a method.

Significantly, a method for producing devices of these types with such attributes as an integral feature of a primary product or larger component can be highly beneficial in eliminating assembly costs and improving product function and aesthetics. Although methods for integrally manufacturing such devices have been proposed (i.e. McVicker U.S. Pat. Nos. 5,368,549, 5,656,226 and RE37338 E; Harvey U.S. Pat. No. 6,224,364 B1, Murasaki U.S. Pat. No. 6,678,924 B2, Buzzel et al U.S. Pat. No. 6,187,247) they tend to be limited by complex apparatus, limited material choices, and compromised product function.

A manufacturing method for producing double-sided fasteners or other structures with undercut elements extending from each surface is also desirable. Presently, for instance, production of double sided hook portions generally requires adhering two separately produced single-sided portions (i.e. Lagomarsino U.S. Pat. No. 5,378,522, Flynn U.S. Pat. No. 4,862,563).

SUMMARY OF THE INVENTION

Figure 1:
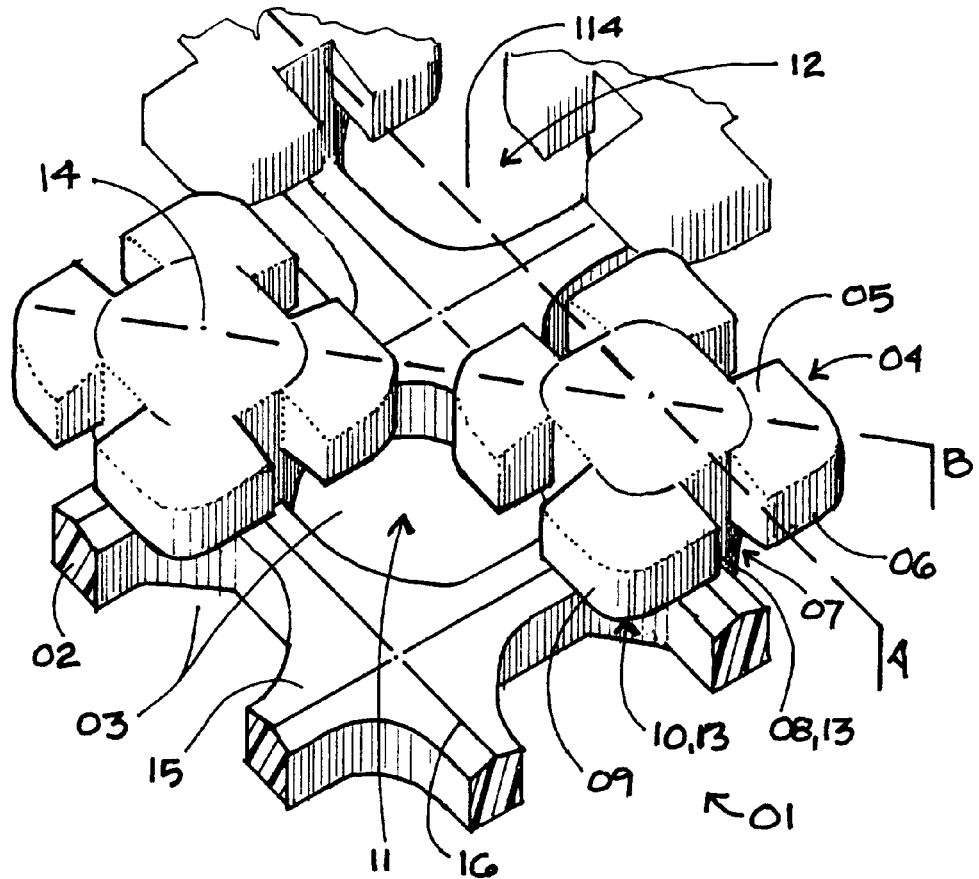
FIG. 1 Perspective view of a portion of an improved fastener of the Slidingly Engageable type (SEF) having multi-directional orientation and a quadrille configuration.

A first object of this invention is to provide a method for economically manufacturing Improved Slidingly Engageable fasteners which can be produced inexpensively in large volume. A second object is to provide a method of economically producing such fasteners of diverse moldable or malleable materials. A further object is to provide such fasteners which are efficient in material usage. A further object is to provide such fasteners which are strong and flexible. A further object is to provide such fasteners in diverse configurations and designs. A further object is to provide such fasteners which include provisions for attachment to a substrate. A further object is to provide such fasteners which have two active sides. A further object is to provide such fasteners which include provision for extracting extraneous matter as they are engaged. A further object is to provide a method of manufacturing any such fasteners as an integral part of a larger manufactured product or product component.

An additional primary object of this invention is to provide a method for economically manufacturing fasteners of many types including SEF, hook-and-loop hooks, and self-engaging fasteners, as well as other devices which comprise a multitude of undercut elements with undersides oriented toward the surface of a common fenestrated base structure. An additional object of this invention is to provide an apparatus for producing such devices. A further object is to provide an economical means for producing SEF, hook-and-loop hook portions and self-engaging mushroom fastener portions in either stand-alone or integrated configurations.

The Improved SEFs disclosed herein include complementary portions each comprising: 1) a fenestrated common base structure having a plurality of fenestrations; 2) a plurality of islands each having at least one stem segment with walls, one or more undercut segments with undersides, and a top with an edge; and 3) a plurality of apertures defined by parts of island walls and parts of undersides of island undercut segments. At least a portion of the fenestrations in the common base structure are correspondent, in a direction generally perpendicular to the plane of the base structure, with corresponding undersides of the islands, and the solid segments of such base structure are generally contiguous with the stem portions of such islands. Each embodiment is designed to be slidingly engageable with a complementary portion upon application of a relative shearing force. The fenestrated base structure may also include larger fenestrations as well as other openings or surface features designed for functional or aesthetic effect.

Embodiments include examples of several types of Improved SEF: a multi-directional SEF arrayed in a quadrille pattern which aligns portions at 90 degree radial intervals and provides resistance to shear stresses of any orientation; a multi-directional portion arrayed in an alternating triangular pattern which aligns portions at 120 degree radial intervals and also provides multi directional shear resistance; a multi-directional portion arrayed in a hexagonal pattern which aligns portions at 60 degree radial intervals and provides multi-directional shear resistance; a uni-directional portion with islands and apertures arrayed in a triangular pattern; a double-sided embodiment which includes two active fastening faces on opposite sides of a common base structure thereby allowing the portion to be attached to separate complementary portions or to be doubled back and attached to itself at another location; a double-sided embodiment having a chevron configuration which provides unidirectional connection to portions on opposite sides; and an example of a product of which such improved fasteners are an integral part. Each of these embodiments are intended to schematically illustrate a range of design options and aspects which generally can be mixed or substituted within the scope of the invention. Embodiments include SEF portions which are molded and have differential profile thickness as well as other embodiments having a relatively consistent profile thickness which may be either molded or formed of a sheet material. Any of the embodiments illustrated can be molded or formed integrally with a primary product or component.

Mechanisms for attaching Improved SEF's to a substrate are also provided. These include: a backing portion having an array of pins designed to penetrate through a perforated substrate and engage with complementary receptors opening to the back side of an improved SEF portion; and an Improved SEF portion having an array of attachment devices projecting from its back side which are designed to penetrate and attach to a substrate. Improved SEFs may also be attached to a substrate by conventional means such as sewing or adhesives.

A method of manufacturing such fastener portions is also provided which incorporates an apparatus that includes a set of interengaging dies to effect a cavity which defines the shape of the resultant product. Each such die includes surface segments which are cavity walls, other surface segments which engage complementary segments of the corresponding die so as to define fenestrations in the resultant product, and associated aspects which are common to known molding or forming technology. The apparatus causes these dies to align and intermesh under sufficient pressure to cause a moldable or malleable material inserted therein to take the shape of the cavity as defined by the cavity walls. Because no portion of the dies are entrapped by any portion of the resultant product, the dies may be readily separated without stressing the undercut portion of fastener elements, and therefore the resultant product design is not limited by the difficulty of molding or forming such undercut portions, and the production process can be expedited.

The present method and associated apparatus is applicable to production of fasteners of the SEF type as disclosed herein and also to production of other structures with multiple undercut elements including hook-and-loop hook portions and self-engaging mushroom fasteners such as those disclosed in the present applicant's pending U.S. patent application Ser. No. 11/076,489, filed Mar. 9, 2005, entitled "molded Surface Fasteners and Attachment Methods" which is herein incorporated by reference.

This method differs distinctly from the common methods of manufacturing other types of surface fastener portions in that both the first and second dies include male and female elements and both may include surfaces which engage with corresponding surfaces of each other in interfacing positions which may be both perpendicular and normal to the common die axis, thereby defining fenestrations in the resultant product. Such fenestrations are aligned at least in part with the undersurfaces of undercut fastener islands thereby defining at least part of the walls of the apertures. The subject method also provides a mechanism for precisely controlling the thickness of molded fastener products in that the engaging surface segments of corresponding dies may be designed to define a specific cavity depth.

It is important to note that another significant advantage of the present method is that by associating plural sets of undercut elements with each fenestration the relative size of individual die portions is significantly larger than the associated elements, thereby abetting the economical production of such small scale elements as are typically found in hook-and-loop and mushroom type fasteners as well as SEFs. Furthermore the shape and profile of such small elements may be precisely controlled and the present method does not require elements to be distorted during removal from the dies, also expediting production.

Yet another significant advantage of the present method is that it produces fastening portions and other products with a fenestrated base structure. Not only does a fenestrated base provide significant economy in material usage, but it allows such products to be self cleaning as well as readily cleanable in that extraneous particles such as water, dust, snow, mud, etc. are readily extracted through the fenestrated structure. Likewise the fenestrated structure is advantageous for products coming in contact with skin or hair in that it is self-ventilating and allows normal perspiration and aspiration.

Furthermore, the present method and apparatus provides a practical and economical means for manufacturing double-sided fasteners and structures. Such products are produced by this method with minimal overall thickness and with significant economy in material usage as well as production time. Therefore, significant new applications including new assembly methods may be provided.

The associated apparatus may be of a type designed for molding a resinous or otherwise moldable substance, or the method may be used in conjunction with an apparatus designed as a cutting/bending press to form a malleable substance such as sheet metal or paper board. Such apparatus may be of a reciprocating type, such as an injection molding machine or reciprocating press, or it may be of a continuous production rotary type wherein the dies are arrayed along the surfaces of counter-rotating rollers or molding belts. Although the subject dies are typically to be designed for a specific product, material, and manufacturing technology related to the type of apparatus used, the common method is applicable to each such technology. Whichever apparatus is incorporated, it typically includes numerous basic elements commonly known to industry including means for: engaging the dies in their aligned position; applying pressure as necessary; inserting raw material; ejecting the finished product; and providing for heating, cooling, lubrication and other subsidiary parts of the process which are not claimed herein.

A significant improvement provided by the present invention is inclusion of the aforementioned fenestrated base structure. This aspect allows such Improved Fasteners to be manufactured economically of diverse materials by the method provided. The fenestrated base also provides for efficient utilization of material, enhances flexibility, provides a means for extracting foreign matter from the fastener assemblage, allows double-sided portions to be produced, allows a fastener portion to be molded or formed as part of a larger product, and provides other advantages which are apparent herein. The fenestrated base can also be designed to enhance the functions of diverting portions into self-alignment and coupling of the portions.

The Improved SEFs also provide significant other advantages including features that enhance usability for many applications. Very low profile, high strength fasteners may be produced because the effective engagement thickness may be as little as only two times the thickness of the material selected. A variety of designs can provide optional configurations and orientations, strength characteristics, functional, and aesthetic aspects. Fastener products can be reinforced or embellished by the inclusion of a reinforcing material. Flexible portions may be furnished in rolled form for shipment and installation. Double-sided SEF portions allow a greater range of application possibilities. Provision of self attachment mechanisms greatly increase the utility of SEF's for many applications and allow fastener portions to be subsequently attached to an end product by an original equipment manufacturer at another site. Provision of such a simple method of production allows fastener portions to be integrally molded or formed with a primary molded or formed product or assembly component, thereby providing such benefits as reduced assembly time and production cost, as well as improved integrated product designs.

Some of the significant advantages of producing fasteners by the method of this invention include the following: The production system is simple and economical and can be readily adopted to commonly known manufacturing systems. Molds of reciprocating or roller type may be produced by commonly known modern machining methods at lower cost than complex multipart molds. Material utilization can be optimized by designing the fenestrated product base in relation to the expected loading, and lower cost materials may be utilized where appropriate. A high degree of precision can be incorporated in the resultant product. Resultant fastener products can have a reasonable degree of flexibility due to the fenestrated base, even when manufactured of a fairly rigid material in order to maximize strength. Product design is not limited by mold release considerations. Because the product undersides may be precisely formed or molded, the strength and release characteristics of resultant fastener products may be designed precisely. Fastener products can be rapidly and economically produced in large quantities, or fastener portions can be integrally manufactured as part of a larger molded or formed product.

DESCRIPTION

Figure 1A:
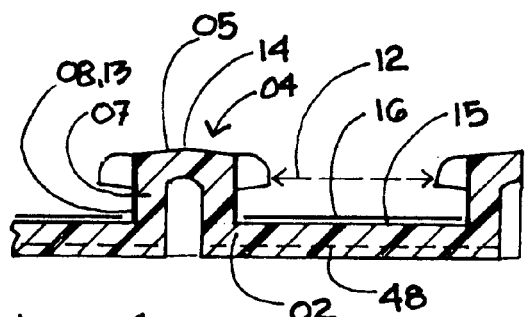
Figure 1B:
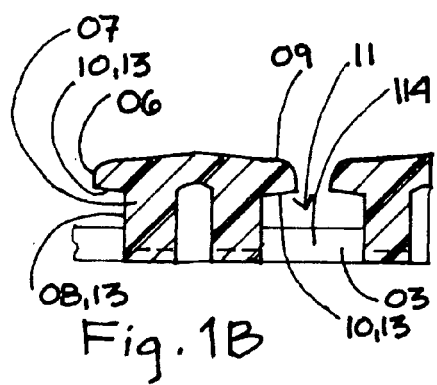

FIG. 1A schematically illustrates a one portion of a first preferred embodiment 01, an Improved Slidingly Engageable Fastener of a quadrille design which includes two substantially identical such portions designed to fasten and interlock with each other upon application of a relative shearing force. Each such portion includes a base 02 with a first basal surface 15 and a plurality of undercut segments 09 which are spaced from the basal surface. At least the second such portion also includes a base 02 with a basal surface 15 having a plurality of fenestrations 03, and also includes a plurality of stems 07 each with a first end attached to the base and extending away from the base and attached to an undercut segment 09 which in turn extends away from the stem so as to effectively provide an undercut island 04 with at least one underside 10 spaced away from said basal surface. Such a configuration therefore provides at least one aperture 11 which is defined by the undersides 10 of two adjacent islands and the stems 07 which connect the islands with said base in such a spaced disposition.

Each portion 01 may also include a plurality of said islands 04, each having a top surface 05 with an associated edge 06, a stem segment 07 with sidewalls 08, and undercut segments 09 with undersides 10, wherein said edge and said undersides are also sidewalls, and further wherein said undersides are aligned, in a direction generally perpendicular to the plane of said common base structure, with at least portions of said perforations. It should be noted that in this and other embodiments, said stems 07 are generally located between said undercut segments, and vice versa so as to effect an island having a top surface 05 with a segmented edge 06. A plurality of apertures 11 may also be included in said portion 01, each said aperture having an associated aperture opening 12, and walls 13: wherein said aperture opening is defined by said associated edge 06 of each adjacent island 04, and wherein segments of said walls are coincident with segments of said sidewalls 08 and other segments of said walls are coincident with segments of said undersides 10. The portions are designed so that ones of said apertures receive ones of said islands so that, when two such portions are aligned (i.e. ones of islands are inserted through corresponding aperture openings) and are slidingly engaged by a relative shearing force, said first and second portions become connected and interlocked. Such interlocked portions may subsequently be disconnected by reversing said relative shearing force or, when the base of at least one portion is sufficiently flexible, the portions may be sequentially peeled apart.

Said first preferred embodiment 01 also, optionally, includes a plurality of conical protrusions 14 at the center of each said top surface of each said island, and as said fenestrated base has a first surface 15 between said perforations, said surface including in this design a complementary ridge 16, so that when the tops of the islands of two said portions are caused to contact by application of a perpendicular pressure, said conical protrusions divert the islands towards adjacent aperture openings 12. Therefore, an imprecise initial alignment of the portions results in alignment at the nearest 90 degree radial interval. Thereafter, as ones of said islands are inserted through said aperture openings 12 and caused to contact ones of said ridges 16 on said first face 15, continuing perpendicular pressure causes ones of said protrusions 14 to divert toward said perforations 03 in said common base structure 02, thereby initiating engagement of the portions by effecting a relative shearing force. This type of embodiment, having a quadrille design, allows fastener portions to be aligned and slidingly engaged at 90 degree radial intervals and thence provides resistance to shearing stresses in multiple directions in that, when subjected to a shear stress of a different direction, said islands tend to relocate and engage with whichever aperture is most closely aligned with such shear stress.

Embodiments of the type 01 illustrated in FIG. 1 are designed to be manufactured of a moldable material utilizing a method incorporating a set of interengaging dies associated with an apparatus which is described below. Therefore, this type of embodiment may include a variable cross-sectional dimension, whereas other types of embodiments, as seen below, may have a relatively consistent cross-sectional dimension and therefore may be manufactured of either a moldable material or of a malleable material by utilizing such method with dies and apparatus of an appropriate design. Such molded embodiments may also include an optional integrally molded reinforcement 48.

Figure 2:
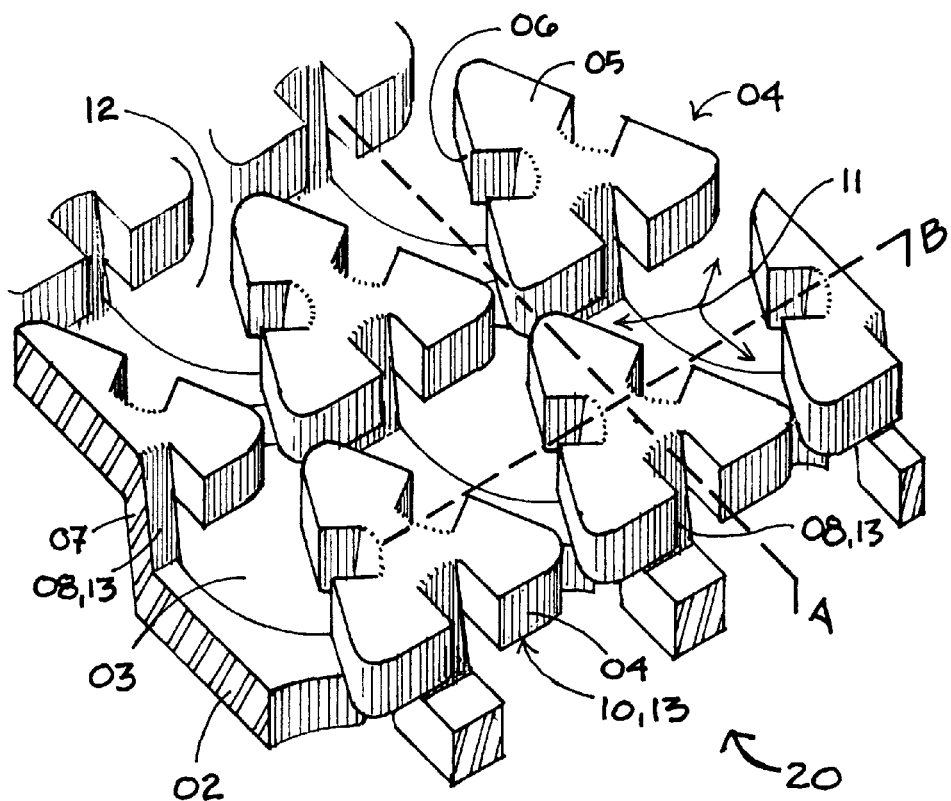
FIG. 2 Perspective view of an improved SEF portion having multi-directional orientation and a triangular configuration FIG. 3 Perspective view of an improved SEF portion having multi-directional orientation and a hexagonal configuration FIG. 4 Perspective view of an improved SEF portion having a uni-directional orientation and triangular configuration FIG. 5 Perspective view of an improved SEF portion having a unidirectional orientation and a stepped profile FIG. 6 Perspective view of improved SEF portions having a unidirectional orientation and chevron-like configuration, also having two fastening sides FIG. 7 Perspective view of an improved SEF portion with multi-directional orientation and triangular configuration, also having two fastening sides.
Figure 2A:
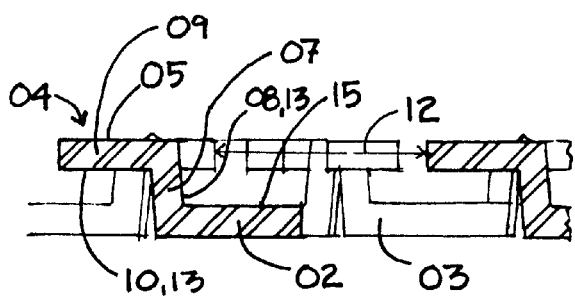
Figure 2B:
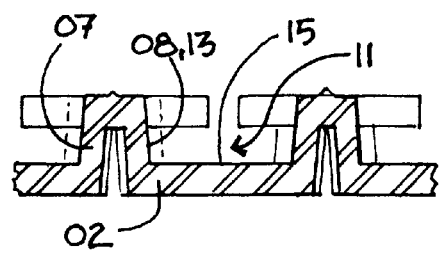

A second type of preferred embodiment 20, as illustrated in FIG. 2, also includes a fastener portion having a fenestrated common base structure 02 with a plurality of perforations 03; islands 04 each having a top surface 05 with an associated edge 06, undercut segments 09 with undersides 10, and a plurality of stem segments 07 with sidewalls 08; and a plurality of apertures 11 each having an associated aperture opening 12, and walls 13 which are coincident with segments of said sidewalls 08 and of said undersides 10 as in the embodiment described above, and is designed to slidingly engage with a similar portion when a relative shearing force is applied. This embodiment is configured so that said top surfaces of said islands and said aperture openings are of a generally triangular configuration arrayed in alternately offset rows, thereby allowing portions to be aligned and engaged at substantially 120 degree radial intervals. An advantage of such a triangulated design is that for many applications such as adjustable straps it provides a readily apparent visual key as to the intended directionality of engagement.

In this type of embodiment 20, each said island 04 has a plurality of said stems 07, and said islands and said common base structure 02 have a generally consistent thickness, so that such a portion may be produced either by molding a moldable substance as in the previously described embodiment or by perforating and forming a malleable sheet material utilizing said method incorporating said interengaging dies and said apparatus.

Figure 3:
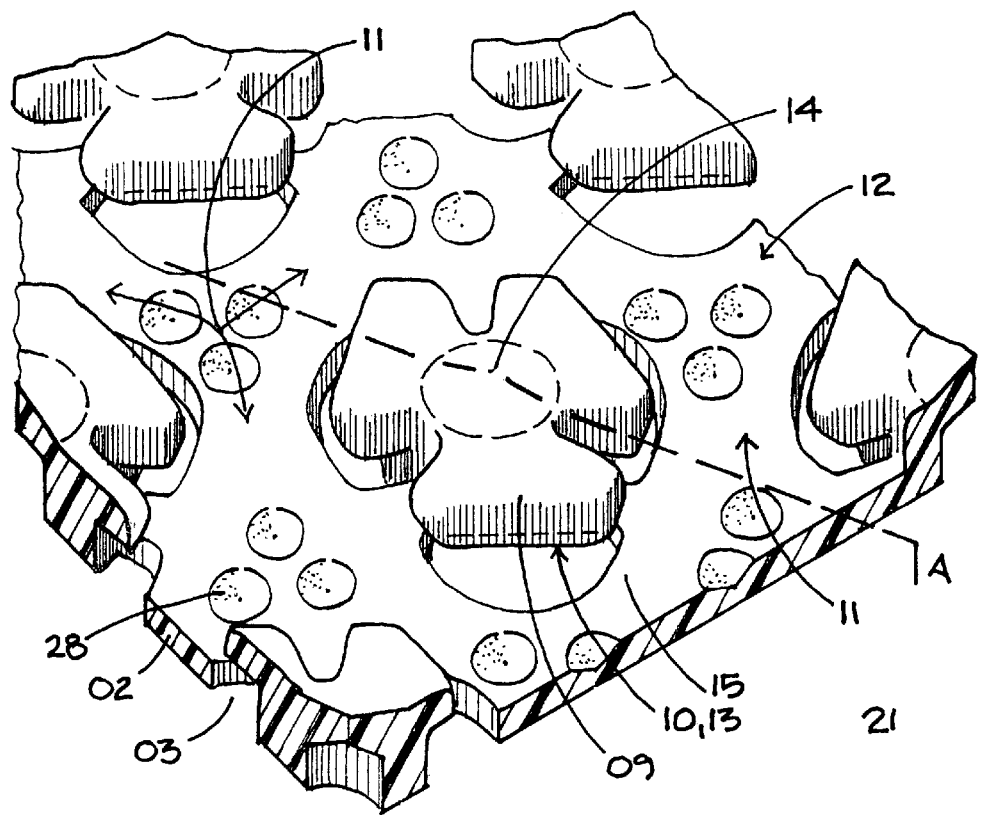
Figure 3A:
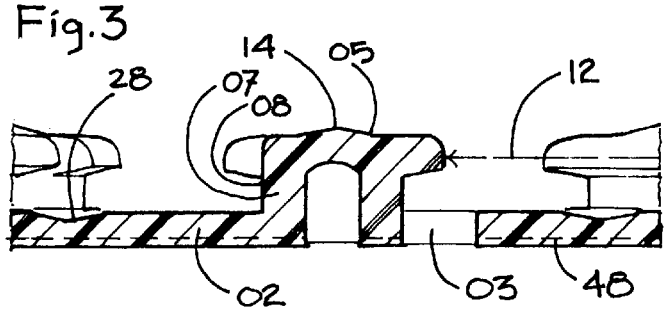

A third preferred embodiment 21, illustrated in FIG. 3, also includes a fenestrated base structure 02 with perforations 03, islands 04, complementary apertures 11 and other aspects as in the previous embodiments. This embodiment, however, is configured in a hexagonal design with islands having a generally hexagonal shape arrayed in offset rows and columns so as to define a multiplicity of apertures associated with each island at 60 degree radial intervals thereby allowing engagement of two portions of such an embodiment at such 60 degree radial intervals. Each island 04 therefore corresponds with six aperture openings 12 defined by adjacent sets of three such islands, whereas each of three undercut segments 09 is included between each of three stem segments 07.

It is apparent that multi-directional embodiments such as this could also include additional divisions of stem and undercut segments, for instance the present embodiment could alternatively include six stems and corresponding undercut segments, etc.

This embodiment 21 also includes island top surfaces having a conical protrusion 14 which is designed to help align and couple said portions. As in the previous embodiment 01, when two such portions are approximately aligned and subjected to compressive pressure, ones of said conical protrusions cause complementary sets of said islands to slide into alignment with said aperture openings so that continuing pressure causes ones of said islands to enter ones of said aperture openings. In this instance, however, the conical protrusions 14 may then be diverted into a corresponding cavity 28 on the basal surface by a relatively slight initial relative shearing force, thereby coupling said portions in an engaged state until an opposing relative shearing force is applied to reverse such engagement. An important aspect of such a hexagonal design combined with such conical protrusions is that two such fastener portions may be pressed together at virtually any radial disposition and will thence self-align at the nearest 60 degree disposition, so long as at least one portion is allowed to rotate up to 30 degrees. Therefore a press-together fastener is provided which may be connected from any initial angular disposition of the portions.

Figure 4:
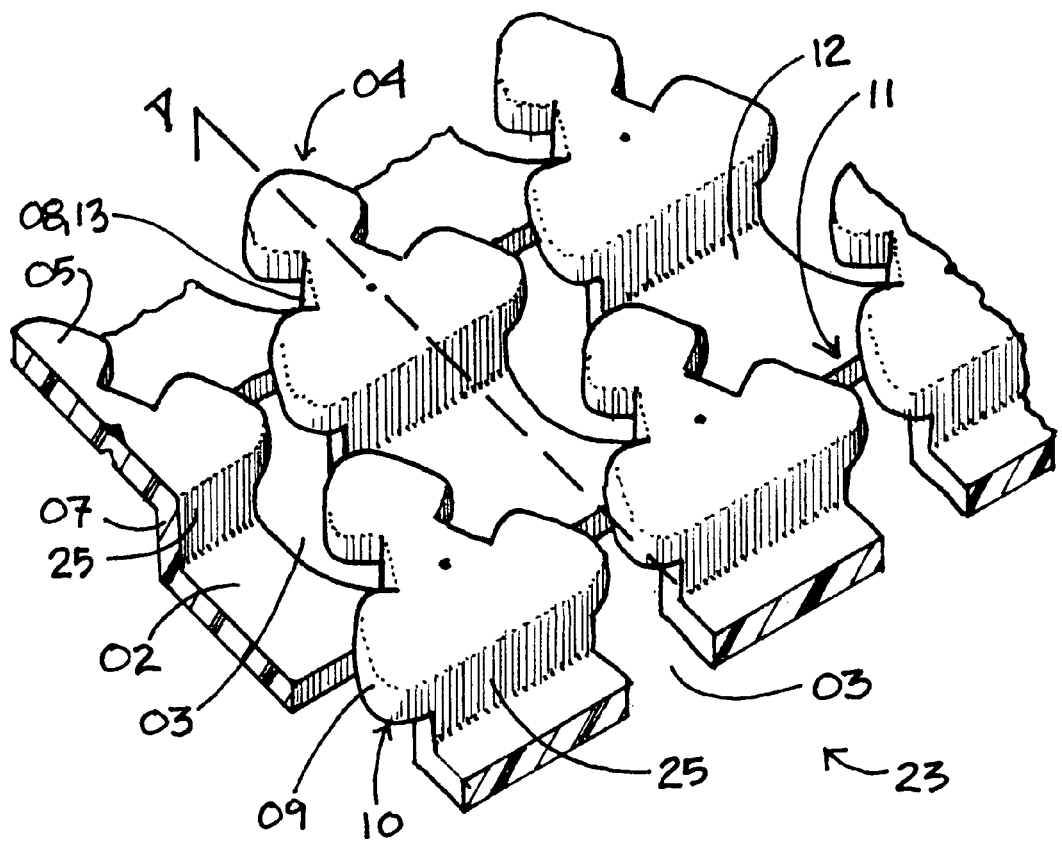
Figure 4A:
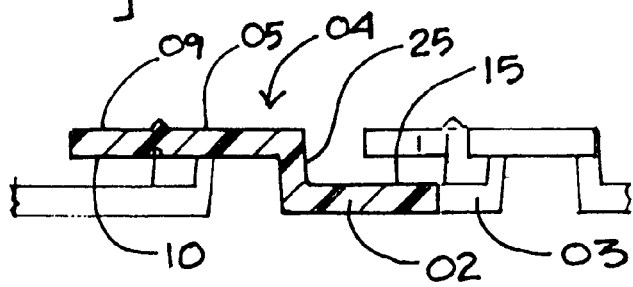

A fourth preferred embodiment, illustrated in FIG. 4, includes an improved slidingly engageable fastener portion 23 having a plurality of triangular islands arrayed in offset rows so as to provide a uni-directionally oriented, longitudinally adjustable fastener. As in the embodiments described above, each portion includes pluralities of islands 04 and complementary apertures 11 associated with a fenestrated common base structure 02. In this type of embodiment 23, each of said islands includes stem segments 07 with sidewalls 08 and also includes undercut segments 09 with undersides, said stem segments and undercut segments being configured so as to define one of said apertures 11 between each pair of adjacent islands designed to receive and engage one island in a directionally opposite orientation. One of each of said stem segments 07 of each said island 04 of this embodiment also provides a stopping wall 25 which is designed to prevent ones of said islands from inadvertently being removed from a pre-engaged disposition when an assembly of said portions is subjected to flexure or to a reversal of said relative shearing force, unless a perpendicular peeling force is also applied. Therefore said fastener portion 23 is designed to primarily resist shear stresses oriented in a single direction and will also resist inadvertent release when said shear stresses are reduced or absent, unless such a perpendicular peeling force is also applied. Such unidirectional fasteners may be designed to provide superior shear and tensile (vertical) strength for applications where only uni-directional stresses are expected, and also to provide relative ease of release by peeling.

Figure 5:
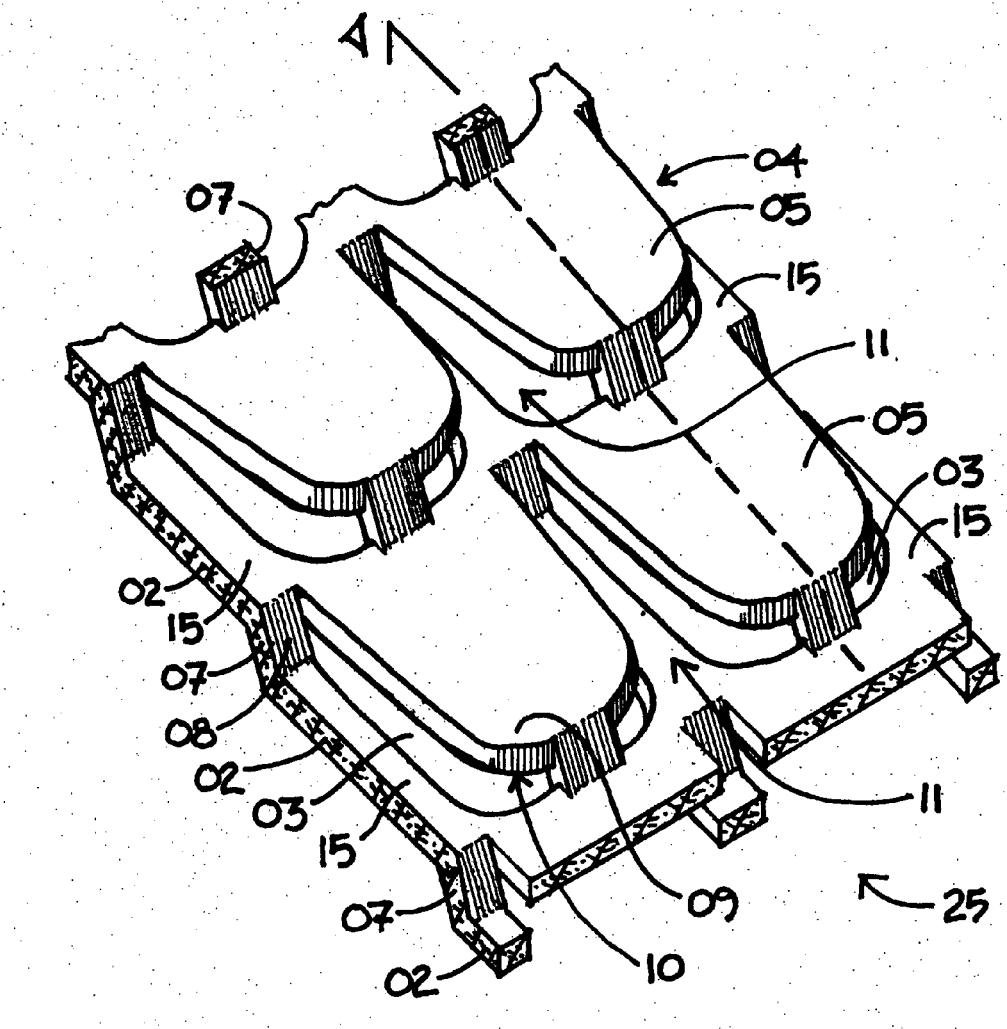
Figure 5A:
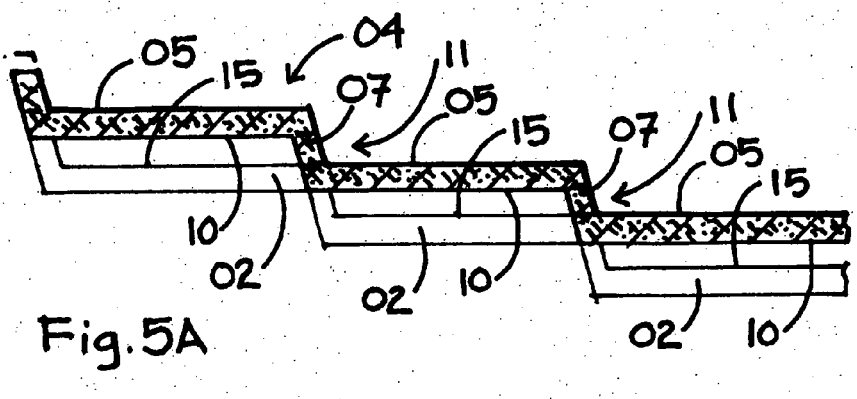

A fifth preferred embodiment 25, illustrated in FIG. 5, includes a plurality of islands 04 configured in a uni-directional orientation in which said islands are contiguous with a common fenestrated base structure 02, said fenestrated base structure being stepped in profile at each alternate row of said islands so as to provide apertures between such islands. Said islands and apertures are arrayed in rows so that a first surface 15 of said common base structure 02 in a first row is substantially coplanar with the top surface of said island tops 05 of a subsequent adjacent second row, and a second surface 19 of said fenestrated common base structure 02 in such a first row is coplanar with ones of said undersides 10 of said islands of said subsequent adjacent row; whereas said first and second surfaces are not coplanar with corresponding islands and apertures of a third adjacent row but are rather spaced from them by a distance equal to one of the aforementioned steps. Said stems 07 connecting said base structure 02 with said islands 05 thereby effect the aforementioned stepped profile and provide structural continuity to the whole. Therefore, a first said fastener portion 25 can be attached to a like portion 25 in opposed disposition, or it can be attached to a further portion of itself when doubled or folded into such a position. It is noted that the term "coplanar" as utilized herein is intended as a relative term not intended to preclude twisting or flexing of the whole or any element thereof. A significant aspect of this type of embodiment is that it can be readily produced of virtually any malleable sheet material by the method herein described using a set of cutting/bending dies in a relatively simple apparatus. Such materials may include sheet metal, paper, cardboard, composite materials, thermoformable plastics, or other sheet materials. Another significant aspect is that this embodiment provides a very low-profile, thus a fully engaged fastener may be only twice the thickness of its base structure. Therefore a wide range of versatile, low-cost, self-aligning, self-attaching, low-profile fastening products is provided which may be utilized for packaging sanitary disposable products and other applications.

Figure 6:
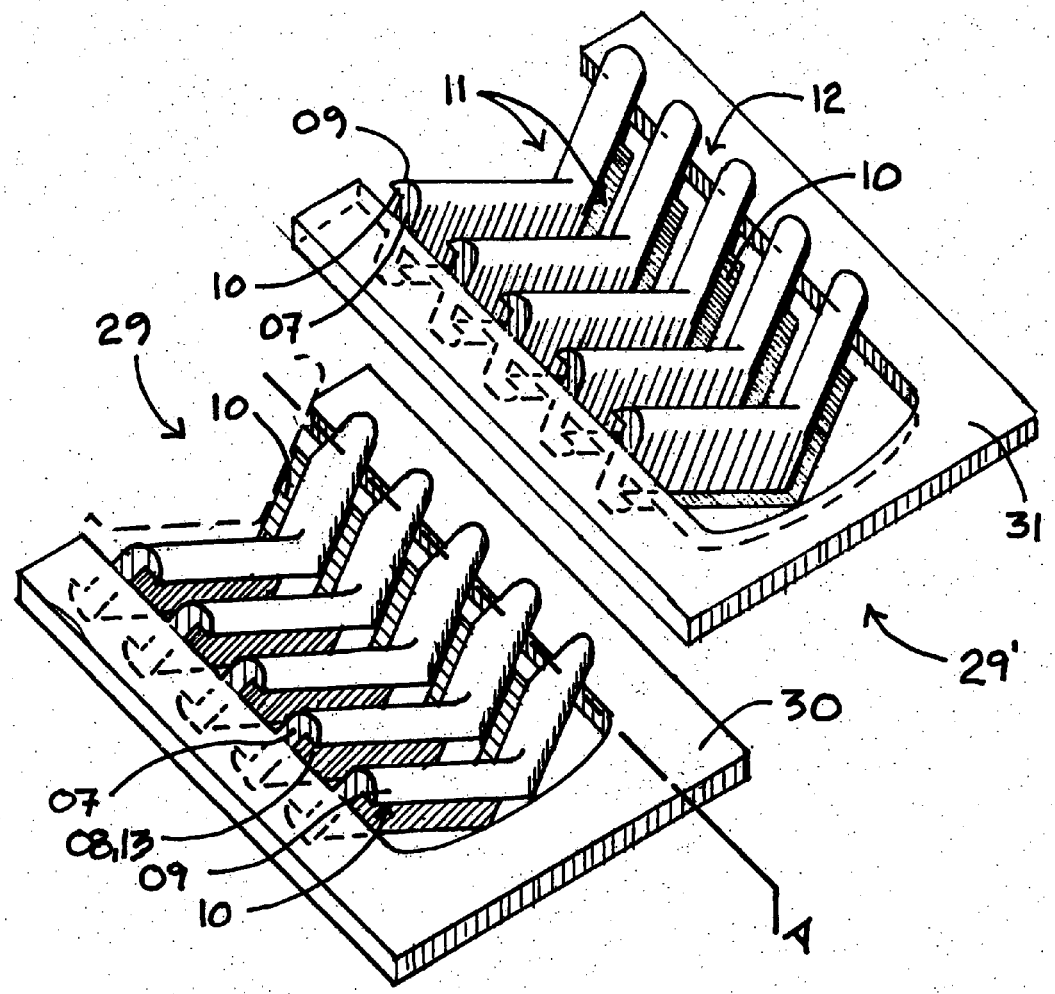
Figure 6A:

A sixth preferred embodiment 29, which is illustrated as the end segments of strap, is shown in FIG. 6. Said embodiment 29 includes a plurality of islands 04 and a plurality of complementary apertures 11 each configured in a chevron configuration on both the first 30 and second 31 sides of common fenestrated base structure 02. Said islands on said first side 30 being configured in a first directional orientation, and said islands on said second side 31 being configured in a second directional orientation; so that the walls 13 of a plurality of said apertures 11 of complementary orientation are defined by said sidewalls 08 of said stem segments 07 and by said undersides 10 of said undercut segments 09 in each of two complementary directional orientations. Therefore, said islands of said first side 30 of said portion 29 may be slidingly engaged with apertures of said second side 31 of a similar portion and vice versa, thereby providing a double-sided self-connecting linear fastener.

FIG. 7 illustrates a fastener portion 32 with multi-directional orientation having two opposite engageable sides of similar design. Each such engageable side in this example includes an array of alternately offset islands and apertures of a triangular design similar to that shown in FIG. 2 above. In this embodiment however, said fenestrated common base 02 is contiguous with said stem segments 07 of islands 04 on both said base structure's first 15 and second 19 faces. Said associated aperture openings 12 are accessible to corresponding islands inserted into either surface at 60 degree radial intervals, and may be engaged at such radial intervals. Therefore, embodiments of said type 32, when attached to a like portion (or to a single-sided portion of like design as in FIG. 2) on either surface, provide multi-directional resistance to shear stresses. It is readily apparent that such double-sided, multi-directional fasteners may also incorporate other designs such as the quadrille and hexagonal configurations shown in FIGS. 1 and 3.

Figure 8:
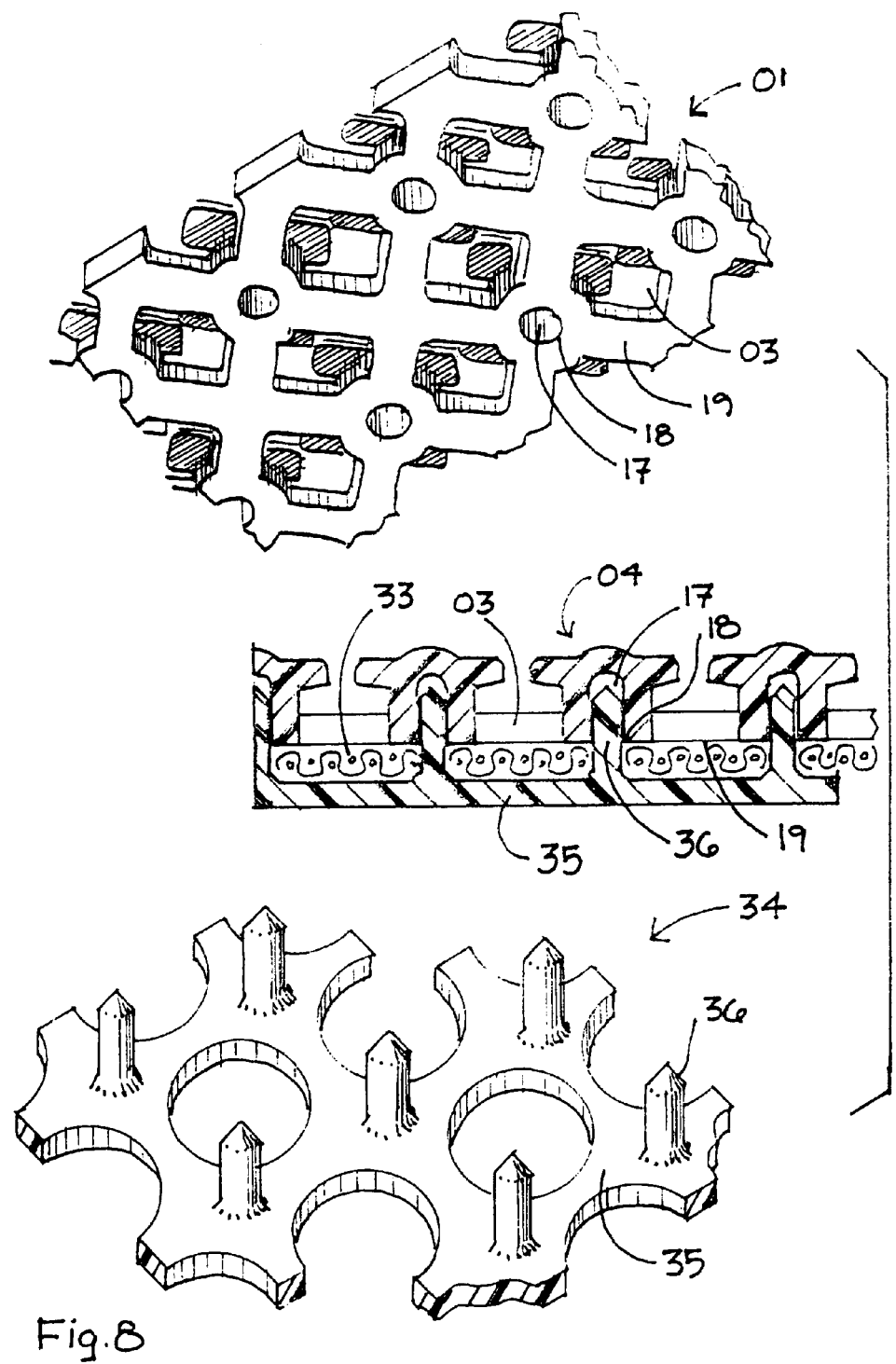
FIG. 8 Expanded perspective view showing the underside of an embodiment with a provision for attachment to a substrate, including sectional view of completed assembly FIG. 9 Sectional view of an embodiment with an alternative provision for attachment FIG. 10 Perspective view of a product incorporating SEF portions as an integral part.

FIG. 8 illustrates a molded fastener portion, such as that of embodiment type 01 illustrated in FIG. 1, along with a backing portion 34 designed to attach said portion to a substrate material 33 such as fabric. Said fastener portion 01 includes a plurality of receptors 17, each such receptor located at the center of each said stem segment 07 and having an associated receptor entrance 18 located on said second surface 19 of said fenestrated common base structure 02. Backing portion 34 includes a contiguous backing structure 35 having a plurality of attaching pins 36 extending therefrom. Said attaching pins are arrayed in a pattern compatible with said receptors of said fastener portion so that said attaching pins may be inserted through perforations 37 in said substrate material and received through said receptor entrances 18 into said receptors 17, thereby attaching said fastener portion to said substrate. Said attaching pins may be permanently retained in said receptors by friction, or may be held by an adhesive, rf welding or other such known technology.

Said backing structure 35 may be designed to provide sufficient flexibility so as to allow the entire assembly to be flexed if desirable for a particular application. Such flexibility may be useful in many applications such as in apparel. Alternatively, said backing structure 35 may be designed to enhance the rigidity of the complete assembly, thereby reinforcing said fastener portion, or a segment of same at its point of attachment, as in an application where a flexible fastening strap is to be connected to a rigid base. Corresponding to such requirements for flexibility or rigidity, said backing structure 35 may include fenestrations as illustrated to enhance flexibility or may be solid and contiguous in order to enhance rigidity.

Figure 9:
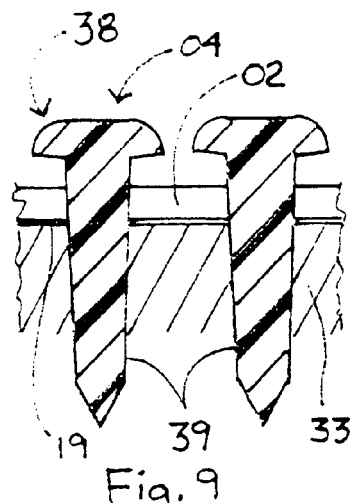
Figure 9A:
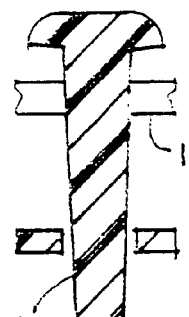
Figure 9B:
Figure 9C:
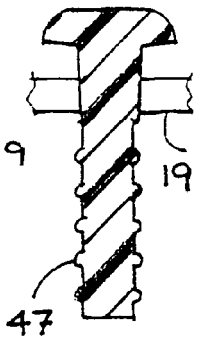
Figure 9D:
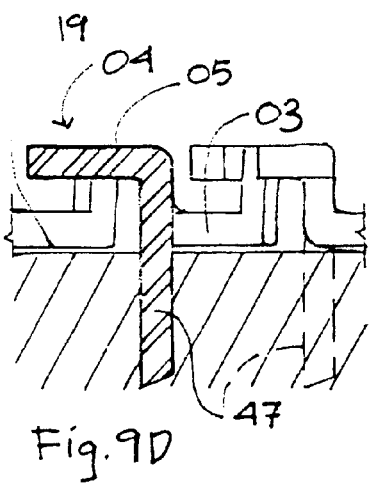
Figure 9E:
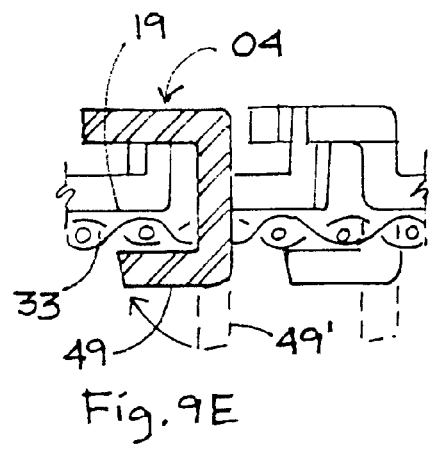

FIG. 9 illustrates an alternative mechanism for attaching a fastener portion 38 to a substrate, wherein said fastener portion is designed to include a plurality of attachment devices 39 extending from said second surface 19 of said base structure. Said attachment devices may be designed in the form of nails 39 as in FIG. 9, rivets 40 as in FIG. 9A, expansion devices 41 as in FIG. 9B, friction fitting devices 47 as seen in FIGS. 9C and 9D, Folding devices 49 as in FIG. 9E, or other device appropriate for attachment to a particular substrate type. Such an attachment device of an appropriate design for a particular substrate may then be attached to same by an appropriate mechanical means such as hammering, peening, expanding, driving, etc.

Figure 10:
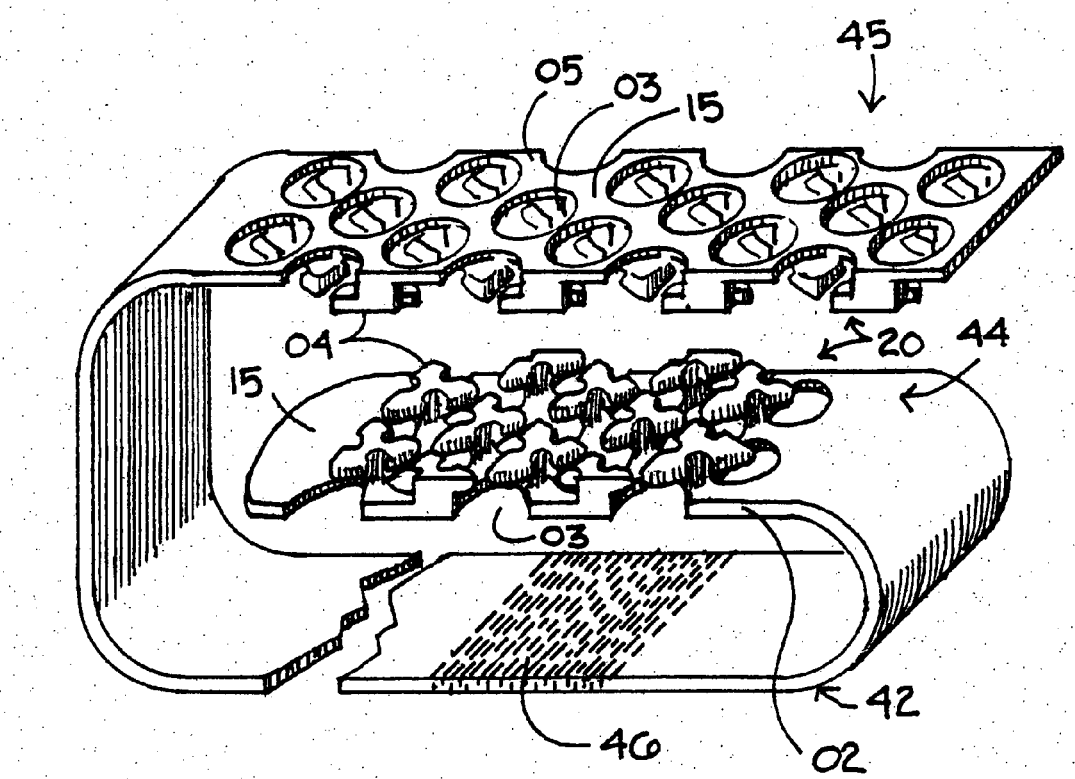

FIG. 10 schematically illustrates fastener portions 20 which are part of a primary product 42, illustrated as a molded strap. Said product 42 is designed to include said fastener portions as an integral part of said product so that when said product is folded toward itself said first and second portions may be adjustably fastened. Said product may include a first portion 44 configured in an upward facing arrangement, and a second portion 45 configured in a downward facing arrangement as illustrated, or may comprise both fastener portions configured in like arrangements. Said product 42 may also optionally comprise a component having a third portion spaced from a fourth portion, wherein the first portion 44 is contained in said third portion and the second portion 45 is contained in said fourth portion. Said product 42 may include an optional elastic segment 46, designed to allow said second part 45 to be stretched prior to fastening so as to provide said relative shearing force as needed to slidingly engage the portions by the inherent elasticity of said resilient segment. It is important to note that virtually any type of improved slidingly engageable fastener may be readily substituted in a product in lieu of the triangular design illustrated. Likewise, it should be noted that a slidingly engageable fastener portion may be integrally molded or formed as part of a wide variety of primary products or components, and that such fastener portions may be utilized for component assembly or as a functional sub-part of such a product or component.

Apparatus and Method

Figure 11:
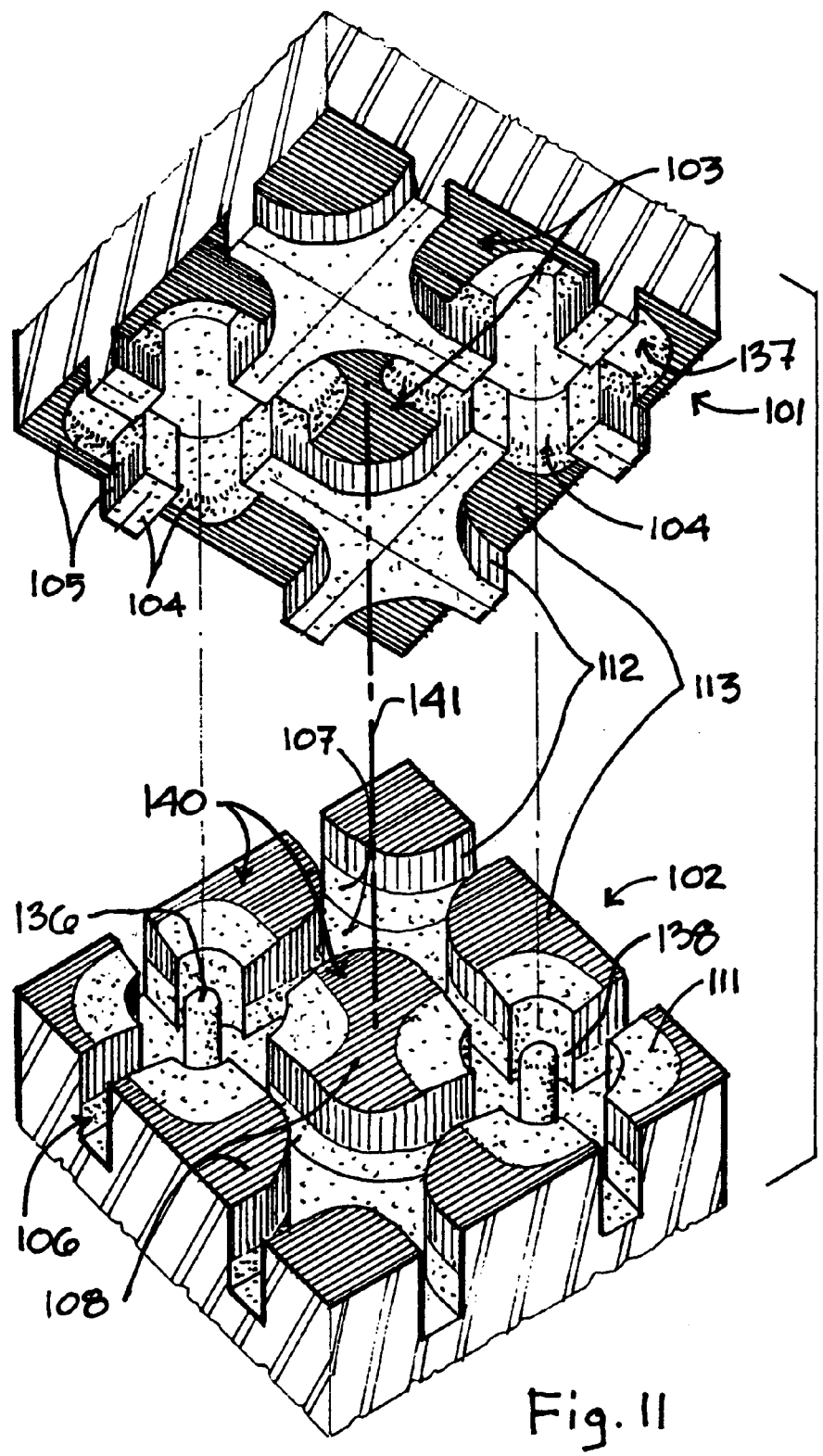
FIG. 11 Schematic perspective illustrating portions of two dies designed to produce a multi-directional SEF portion FIG. 12 Schematic perspective illustrating portions of two dies designed to produce a unidirectional SEF portion FIG. 13 Schematic sectional view illustrating portions of two dies designed to produce a product incorporating two SEF portions FIG. 14 Schematic sectional view illustrating portions of two dies designed to produce a double sided SEF portion FIG. 15 Schematically illustrates in sectional view a reciprocating molding apparatus which includes a die set FIG. 16 Schematically illustrates in sectional view a reciprocating cutting/bending apparatus including a die set FIG. 17 Schematically illustrates in sectional view a rotating cutting/bending apparatus including a die set FIG. 18 Schematically illustrates in sectional view a continuous molding apparatus including rotating molds incorporating a die set FIG. 19 Schematically illustrates in engaged cross section portions of two dies designed for producing hook portions as part of the present apparatus.

A Method for producing Improved Slidingly Engageable Fastening Devices of various types includes the provision of an apparatus for engaging a set of interengaging dies and such dies in order to cause a material inserted or injected into a cavity provided by such dies to take the desired form of such fastening device, as further described below. FIG. 11 schematically illustrates a portion of such a set of dies designed to produce a molded fastener portion of the type 01 shown in FIG. 1, however it should be emphasized that the subject method may be applied to improved fastener embodiments of any type in a wide range of materials. Such other fastener embodiments include hook-and-loop hook and self-engaging mushroom portions as well as other structures with multiple undercut elements.

The method described herein, incorporating an apparatus with a set of partially bypassing interengaging dies as in FIGS. 11-19, may be effectively utilized to produce a wide range of products having a plurality of undercut elements with undersides oriented toward the surface of a common base structure. In addition to SEF fasteners, the present method and apparatus is applicable to the production of hook-and-loop hook portions, interengaging mushroom portions, or other structures having pluralities of undercut elements, as well as for integrally molding such devices. Embodiments of such devices are disclosed in the present applicant's pending U.S. patent application Ser. No. 11/076,489, filed Mar. 9, 2005, entitled "molded Surface Fasteners and Attachment Methods" which is herein incorporated by reference. In general such structures are characterized by multiple stem-like elements extending away from one or both sides of a generally planar fenestrated common base to undercut terminal ends which overhang the fenestrations in the common base. The structures may also be portions or regions of such elements within larger structures having other portions or regions without such structures.

For producing any such device, the present method includes the following steps which are schematically illustrated in FIGS. 11-19.

First: Providing an apparatus comprising a first die 101 and a second die 102 arranged on a molding axis 141, and a means for engaging the first and second dies along the molding axis to produce a product.

a. The first die 101 includes at least one cavity 103 with a cavity opening and a plurality of first surface segments which are cavity walls 104 and other surface segments 105 which are first interfacing walls for interfacing with corresponding surface segments of the second die to effect gates. Interfacing walls 105 oriented generally parallel to the molding axis effectively disjoin the cavity walls 104 of distinct stem chambers, and other contiguous interfacing walls generally perpendicular to the axis at the cavity end conjoin between cavity walls 104 to define at least one terminal chamber associated with each stem chamber. (It is important to note that the term generally parallel as used herein is intended to include any angle of relationship up to 45 degrees from the axis 141 and the term generally perpendicular as used herein is intended to include any angle of relationship between 45 and 90 degrees from the axis, so as to allow for variables of product and machine design).

b. The second die includes at least one core portion 140 corresponding with each at least one cavity 103 of the first die. This second die also includes surface segments which are second cavity walls 107, surface segments providing second interfacing walls 108 for interfacing with the interfacing walls of the first die, and other surface segments 111 on the core end which are cavity walls coincident with the undersides of the discrete terminal chambers associated with each stem chamber.

Figure 15:
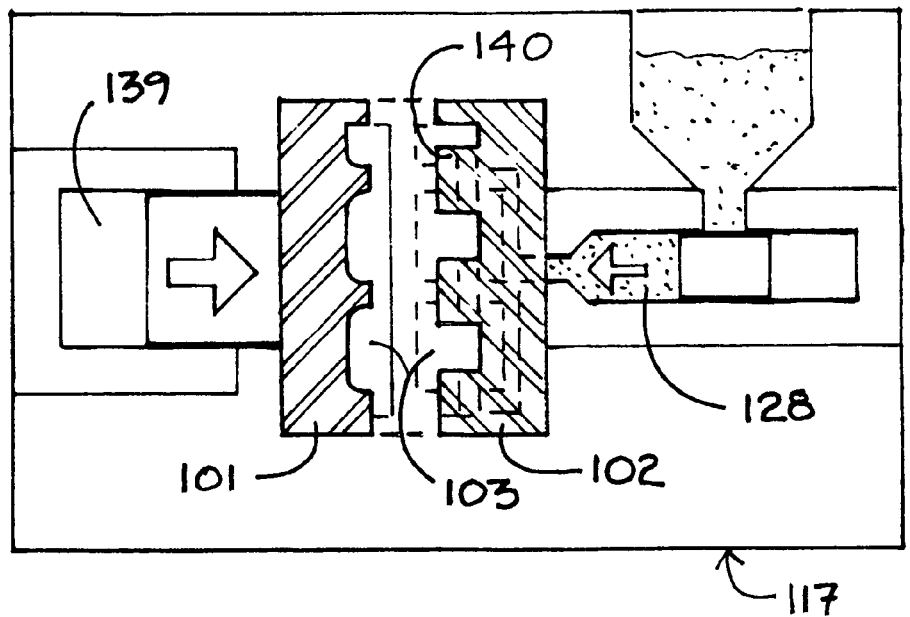
Figure 16:
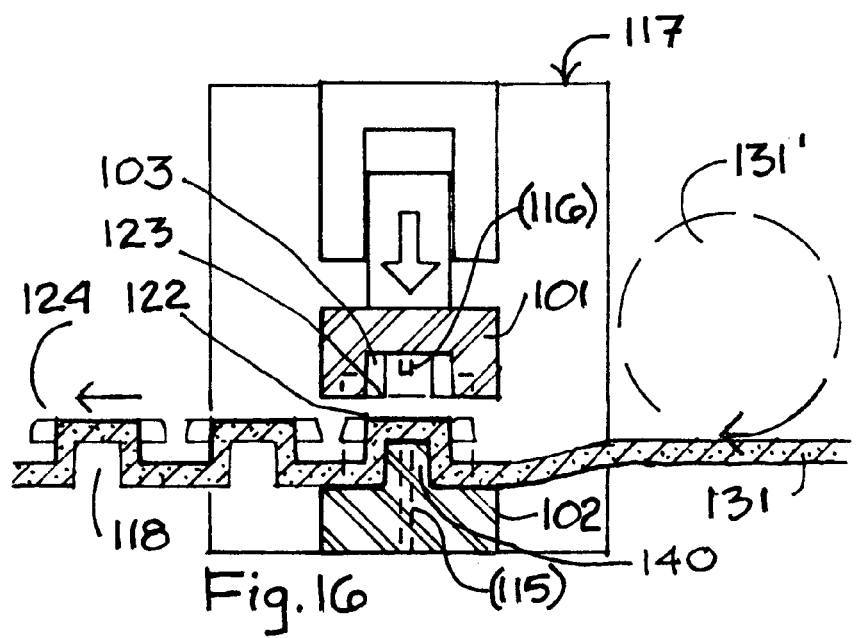
Figure 17:
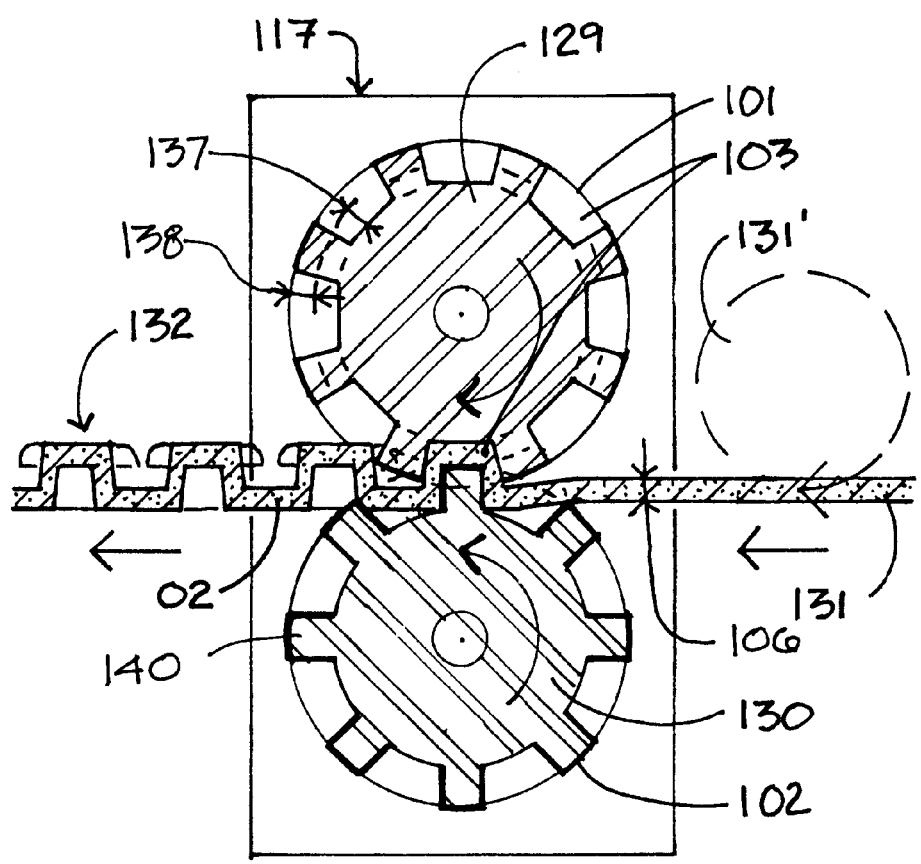
Figure 18:
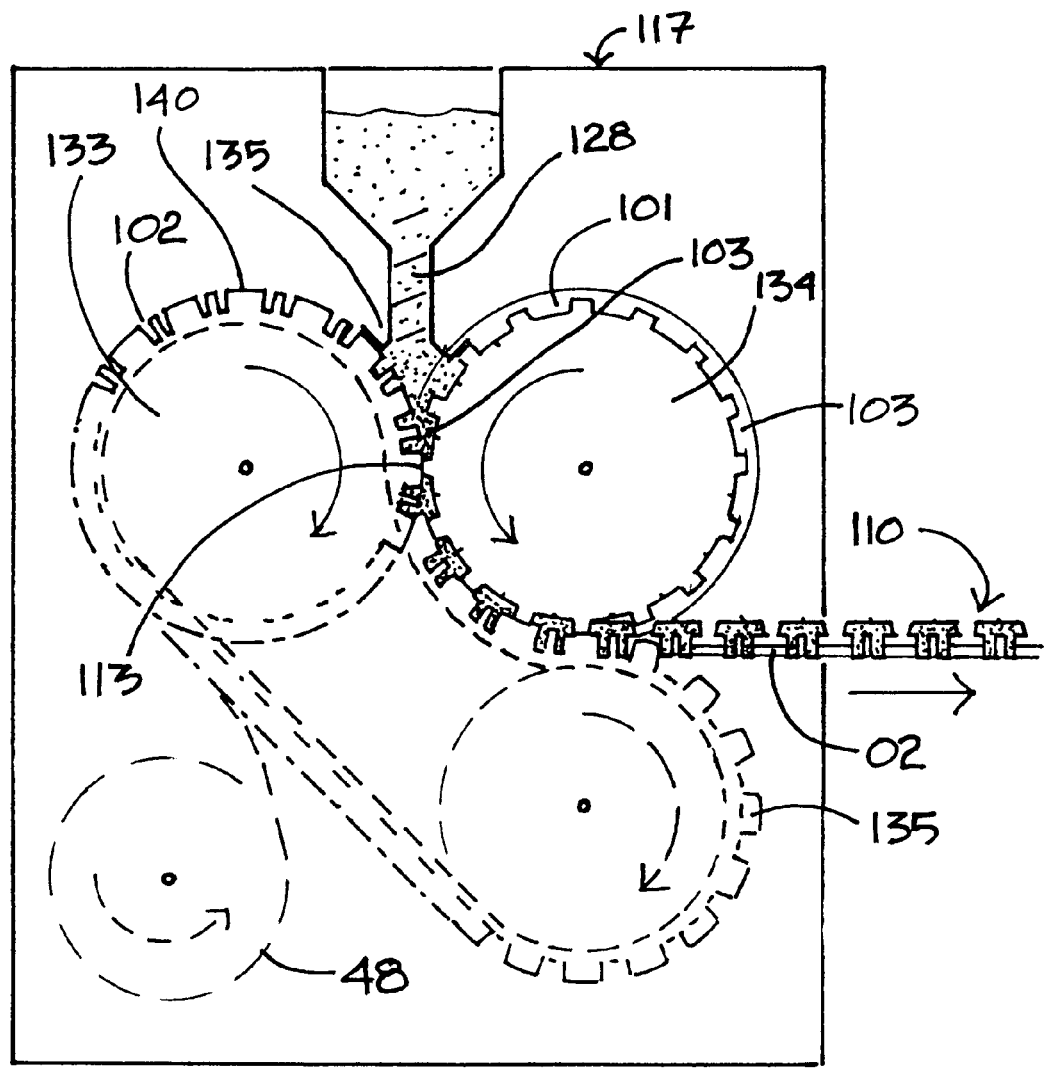

The first and second dies are configured so that when they are engaged along the molding axis 141, core 140 partially bypasses the cavity opening so that its end interfaces with the cavity end to effect a segmented gate 113 partially segmented by the plurality of terminal chambers. Because the core 140 is longer than the depth of the cavity as measured in the direction of the axis, a common cavity 106 is effected between the first and second dies, interrupted by a block-out effected by the base segment of the core. A plurality of the distinct stem chambers 138 each extend away from the common cavity 106 to a terminal chamber 137 with at least one underside extending partially over the core end coincident with a segment 111 of second cavity wall. Therefore a contiguous cavity is proscribed comprising the common cavity portion 106 with at least one block-out and a plurality of stem chambers 138 extending away from the common cavity at the edge of the block-out to terminal chambers 137 with undersides 111 extending over the core 140, the core effecting a block-out in the common cavity.

c. The preferred means for engaging the dies and producing a product for general production or for integrally molding plastic parts is a reciprocating injection molding machine as schematically illustrated in FIG. 15. However, other means which may be optionally utilized are schematically illustrated in FIGS. 16-18 including: reciprocating or rotary die cutting and pressing mechanisms; continuous injection molding/extruding mechanisms incorporating counter-rotating rollers or combinations of rollers and belts, including roller/dies comprised of stacked plates; or any type of mechanism for engaging a set of dies to produce a product. The most appropriate means is to be selected from a choice of available mechanisms for manufacturing most suitable for the material choice and intended application of the resultant product.

Second: Causing the first die 101 to engage the second die 102 so that surface segments 105 of the first die 101 interface with surface segments 108 of the second die 102 to effect gates. These gates are generally contiguous relative to each core and include: a plurality of gates of a first type 112 generally parallel to the axis which divide discrete stem chambers and define fenestrations in the resultant product; and gates of a second type 113 generally perpendicular to the axis which isolate the discrete stem chambers from others associated with each core and prevent further compression of the dies, thereby defining the thickness of the resultant common cavity 106 between the dies 101, 102. Therefore, a contiguous cavity 103 is provided comprising the generally planar fenestrated primary chamber 106 communicating with a plurality of distinct stem chambers, each stem chamber 103 terminating at an underside 111 which is oblique to the molding axis and extends over the core 140.

Third: Filling the resultant cavity 103 with a moldable material. In an apparatus which includes an injection molding machine or continuous molding machine the material may be a thermoplastic resin, silicon, composite material, fiber or metal injected into the cavity between the engaged dies. In an apparatus which includes a die cutting and forming machine as in FIGS. 16-17, a ductile sheet material is inserted prior to engaging or reengaging the dies.

Fourth: Causing the material to cure as necessary by heating, cooling, or other process specific to the chosen moldable material so that the resultant product will maintains its desired form when removed from the apparatus.

Fifth: Ejecting the product from the apparatus. The resultant product therefore includes a contiguous fenestrated base structure with a plurality of undercut stems extending away from the base structure, each stem terminating at an underside extending over an associated fenestration in the base structure.

The present method is particularly useful for mass producing products which include relatively small undercut elements and for integrally molding such devices as part of a primary product because: a plurality of such small elements are associated with each single core/cavity die set, thereby allowing relatively large die core elements so as to minimize stress on the die parts; material is minimized and efficiently utilized; thickness of the structural base as well as the shape of fastening elements is precisely controlled; and the simplicity and adaptability of the system promotes significant economies. Because it is often desirable to produce fastener portions at a minimal size with a high degree of precision, and because the minimum thickness for reliably producing injection molded parts of thermoplastic materials is generally considered to be approximately 0.020", mold design tolerances become critical. Use of the present apparatus and method allow such small scale elements to be manufactured and integrally manufactured reliably, precisely, and economically by common injection molding technology as well as by other means noted below.

It is important to note that both the first die 101 and second die 102 of each embodiment of the apparatus may include both male and female segments. However, in each embodiment, the second die 102 includes at least one core segment 140 which is longer than the depth of at least one corresponding cavity 103 of the first die 101, as measured parallel to the axis. Therefore, when the dies are engaged, contact regions of each die effect gates of a first type 112 generally parallel to the axis at the bypassing zone of each die, as well as gates of a second type 113 where the core end contact regions engage the cavity end contact regions; the differential in core length effecting a common cavity surrounding the block-out at the base of each core.

Furthermore, it is important to note that the present method includes embodiments of the apparatus with diverse variables regarding the three-dimensional shape of stem chambers and terminal chambers. Therefore, cavity walls 104, 107, and 111 are generally not necessarily coplanar with respective adjacent interfacing walls 105, 108 or gates 112, 113, and they may include a diversity of three-dimensional shapes.

Figure 13:
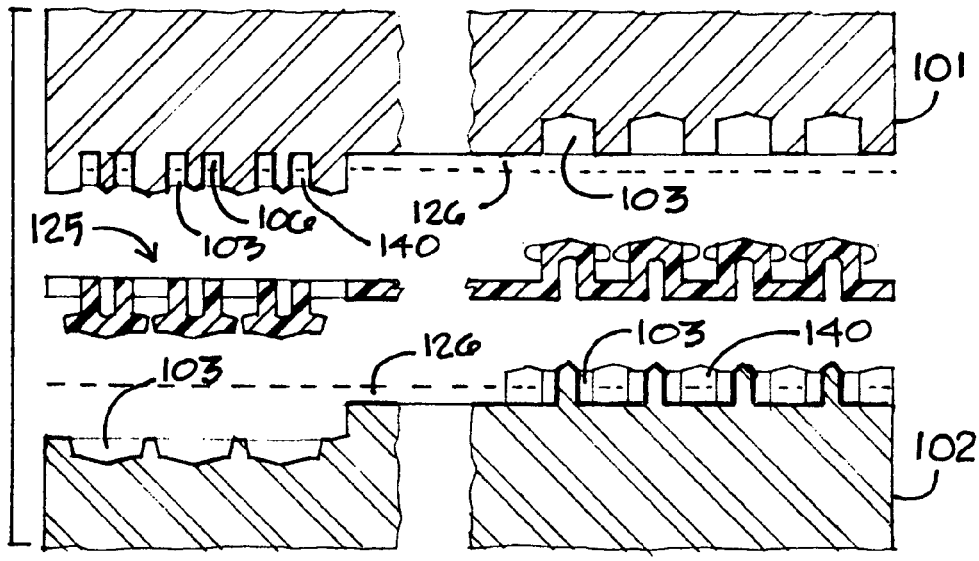
Figures 14, 14A:
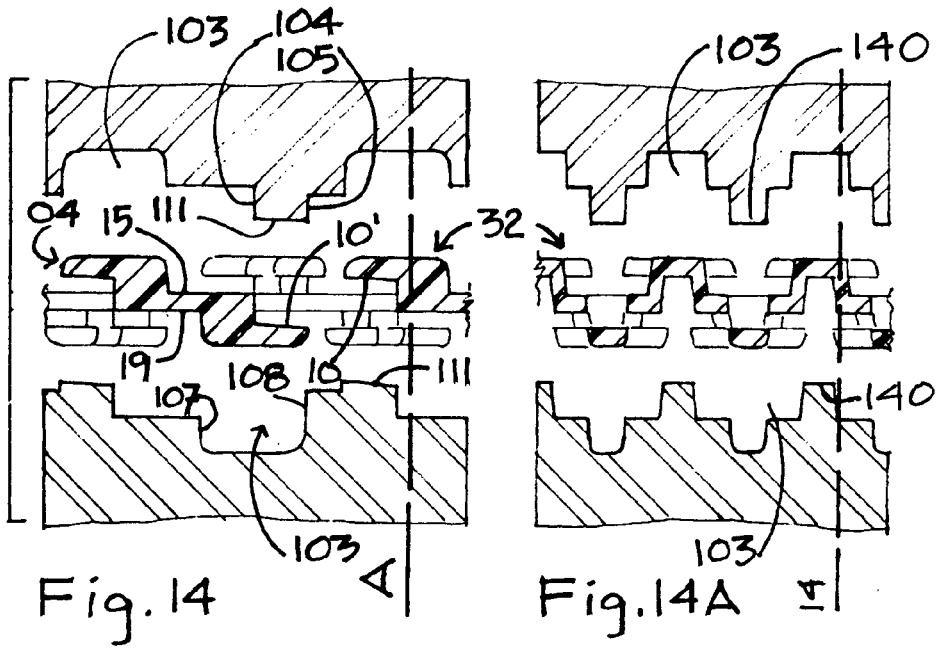

The present method may also be utilized to produce double-sided fasteners and other products with pluralities of undercut stems extending from opposite surfaces of a common fenestrated base structure, as illustrated schematically in FIGS. 13-14, by modifying the apparatus so that both the first die and the second die each include at least one segment which is a cavities and at least one segment which is a corresponding core. Therefore when the dies are engaged along the molding axis 141, core segments 140 of each partially bypass corresponding respective cavity openings so that the core ends engage with cavity ends, stopping further relative movement of the dies so as to effect a fenestrated common cavity 106 between the dies with pluralities of stem chambers 138 extending between each core and cavity to undercut terminal chambers 137 extending over the effective block-out provided by each core.

With reference to FIG. 11, schematically illustrating a set of dies for producing a slidingly engaging fastener portion of the type seen in FIG. 1, a first die 101 comprises a plurality of cavities 103 which include surface segments 104 which are cavity walls, and other surface segments 105 which provide interfacing walls for gates defining fenestrations 03 in the resultant product 01. A second die 102 also comprises said plurality of cavities 103 and includes core 140, surface segments 107 which also are cavity walls, other surface segments 108 providing interfacing walls for gates, and also includes surface segments 111 which are cavity walls defining the undersides 10 of the resultant product 01. Said interfacing walls for gates 105 include a contact surface which is designed to engage with a contact region of said interfacing walls for gates 108 when said first and second dies are intermeshed so as to define fenestrations 03, wherein ones of such fenestrations are at least partially aligned with ones of undersides 10 of said product in a direction perpendicular to base structure 02. When said first and second dies are engaged by an appropriate apparatus, said cavities 103 are interconnected so as to define the common cavity 106 which defines fenestrated base structure 02 of said product, as well as contiguous stem chambers and terminal chambers which define the integral stems, islands and surface features of the product. Said first and second dies may also typically include a perimeter gate and other aspects necessary for production known to industry which are not herein claimed.

It can be appreciated from FIG. 11 that said cavities 103 include cross sections which are contiguous and other cross sections which are not contiguous. Said interfacing walls for gates 105, 108 are designed to engage each other so as to effect interfacing gates of a first type 112 which are substantially parallel to the molding axis (that is, generally parallel to the molding axis which is perpendicular to the interfacing plane of each said die). Typically the walls of said gates of this first type are at least slightly inclined relative to the molding axis to allow molds to release without lockup. When said first and second dies are engaged, certain of such gates of the first type 112 effectively define the common cavity 106 and the interspersed stem chambers 138. In addition, said surface segments 105,108 engage each other in a juxtaposition which is substantially perpendicular to the molding axis so as to effect interfacing gates of a second type 113, thereby precisely defining the depth of said cavity 106, and therefore defining the thickness of said base structure 02 and the associated structure. Said cavity 103 may be filled with a thermoplastic resin or other moldable material so as to provide a molded product, using technology known to industry.

It is important to note that the die portions of the apparatus schematically illustrated in FIG. 11 are designed to produce a slidingly engaging fastener of a quadrille design with a plurality of common "islands", each undercut on four sides and associated with a common stem. Therefore FIG. 11 illustrates the cavity and corresponding core central to the illustration as well as portions of surrounding cavities and corresponding cores which define other leaves associated with each distinct "stem". In this embodiment, each stem chamber of the apparatus is defined by the cavity walls of four adjacent core segments, and a single terminal chamber projects over portions 111 of the ends of the four adjacent core segments. Additionally, FIG. 11 illustrates optional sub-cores 136 located at the center of each stem, which do not have interfacing surfaces, here provided to maintain uniform mold thickness and as part of the optional attachment mechanism seen in FIG. 8.

Referring back to FIG. 1, it should be noted that said fenestrated base structure 02 of said product 01, as defined by said cavity 103, includes fenestrations that align, in a direction generally perpendicular to said fenestrated base structure, with said undersides 10 and also include additional fenestrated areas 114 which do not align in such direction with said undersides. Such additional fenestrated areas allow a product to be designed to provide maximum economy of material and to enhance the flexibility of said product as may be desired for certain applications. Said additional fenestrated areas 114 also allow said dies to include interfacing gates of type 113 as described above, so as to precisely control the relative thickness of said product. Said additional fenestrated areas 114 may also be incorporated to enhance function by receiving the conical protrusions 14 of corresponding islands, to provide means for attachment (as by sewing), to provide aesthetic effect, or to otherwise enhance said product.

Means for engaging and producing a product of diverse generic types, as schematically illustrated in FIGS. 15-18, is provided to align, interengage, and pressurize said first and second dies 101, 102. When said first and second dies are caused to align and interengage by such a means, said cavity 103 is provided having sidewalls which generally coincide with the surface of the desired product (such as 01). When a flowable or malleable moldable substance is inserted between said first and second dies, said apparatus causes pressure to be exerted on such substance within said cavity so that such substance is forced to take the general form of said cavity 103, thereby providing said product. Such substance may be a moldable material such as thermoplastic resin or fibrous slurry. Alternatively, when the product is of a design that includes a generally consistent thickness, said substance may be a malleable material such as sheet metal, formable plastic, paper, composite material, or paperboard. In the former instance, said moldable substance is generally injected under pressure and is intended to completely fill said cavity 103. In the latter instance, said malleable material is intended to take the approximate shape of said cavity 103 but does not necessarily fill said cavity completely.

Figure 12:
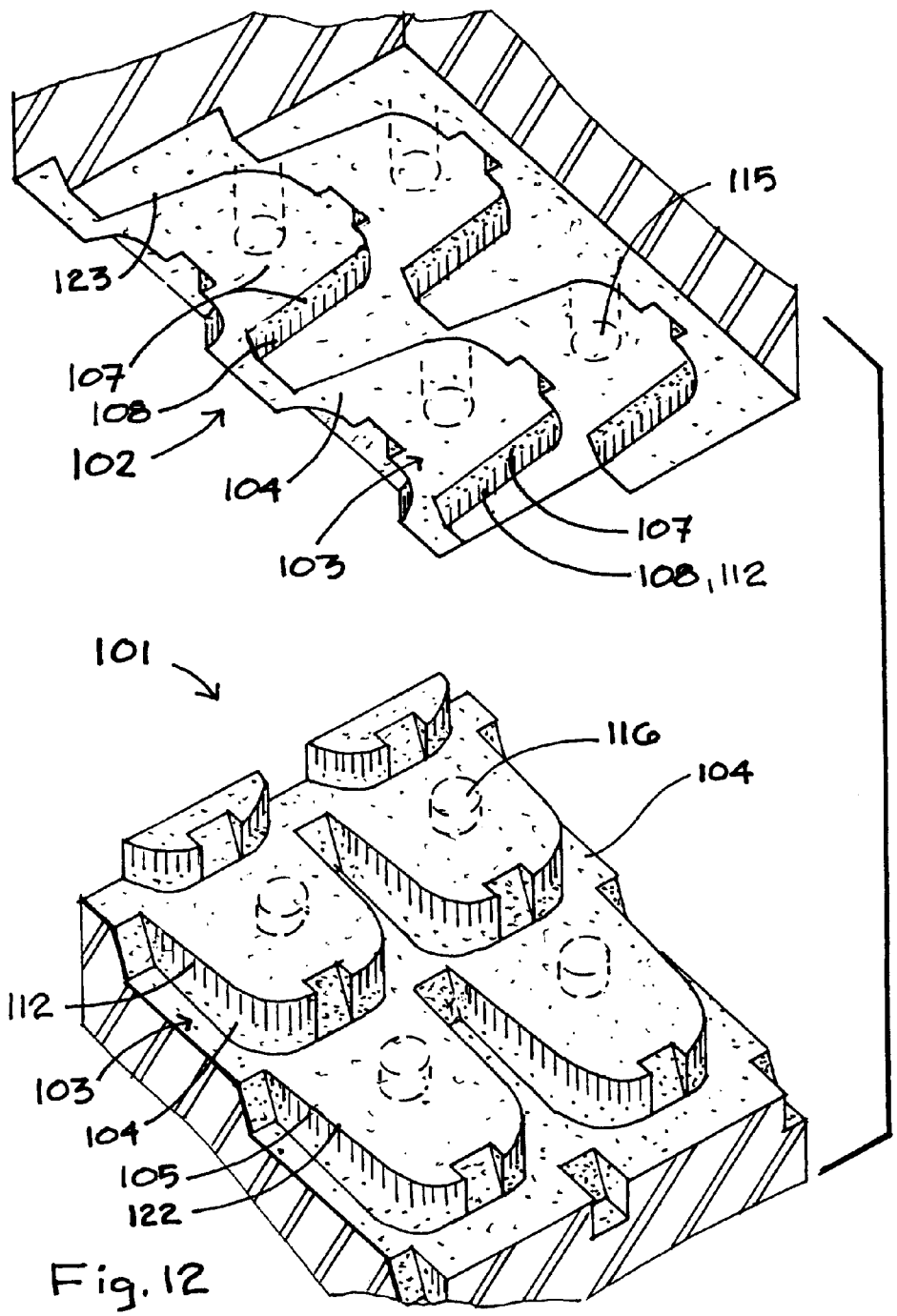

FIG. 12 illustrates a set of dies designed to produce a directionally oriented slidingly engageable fastener of the stepped type 25 as seen in FIG. 5 above. A first die 101 includes cavities 103, cavity walls 104, and surface segments which define perforations 105. A second die 102 includes cavities 103, cavity walls 107, and other surface segments which define perforations 108. Said first and second dies may be included in an apparatus designed for molding so that said cavities 103 may be filled with a moldable substance to provide a fastener portion 25, as in the previous example. Alternatively, it will be noted that said Slidingly. Engageable Fastener Portion 25 as well as other embodiment types are of a design which can also be produced by forming a malleable sheet material such as paper or sheet metal, depending only on the general type of apparatus chosen and specific design of said dies as to hardness, scale, etc. Where the subject method is utilized to form a product of a such malleable materials, at least one of said first and second dies generally includes a plurality of punching segments each having a punching surface and a plurality of edge segments having cutting edges 122 and the other of said dies generally includes edge segments providing complementary anvils 123. It should be noted that the subject method used to produce such "formed" fastening portions has significant utility, providing on one hand an inexpensive means of producing relatively strong sheet metal fasteners for use in construction and industry, and on the other hand a range of inexpensive fiber, paper, or biodegradable fasteners for disposable sanitary products, packaging and temporary assembly.

Optionally, one of said first and second dies may also include a plurality of ejection slots 115, each said ejection slots being aligned with a secondary punching segment 116 of the other of said first or second dies, which surface segment is intended to punch through said malleable material so as to eject a part thereof, thereby providing said additional perforated areas 114 as otherwise described above in a molded product. It should be noted that when producing a formed fastener product of a sheet material as in this instance, dies having said interfacing gates of the second type 113 as described above are unnecessary, in that the thickness of material is generally predetermined.

FIG. 13 schematically illustrates a set of said first and second dies as described above which also include aspects defining a another primary product 125 of which two of said fastener portions are an integral part. In this example said primary product might be an elongated plastic strap similar to the embodiment 43 of FIG. 10 (but having fastener portions comprising a quadrille configuration as in embodiment 01) having complementary fastener portions at each end which in this instance are configured in opposing directions and oriented to opposite sides of said product so that one end of the resultant said strap may be adjustably attached to the other. Said interconnected cavities 103 are also interconnected to a primary cavity 126, which defines said product 125. It is important to note that virtually any formable or moldable primary product or component could likewise incorporate a fastener portion as a subsidiary portion of the whole by incorporating a set of dies as herein described as subparts of the dies used to produce such primary product or component.

FIG. 14 schematically illustrates how the subject method may also be utilized to produce double-sided fasteners such as that of type 32 of FIG. 7 above. A set of said first and second dies 101,102 are substantially identical, each having cavities 103, cavity walls 104,107, interfacing gates 105,108 and walls defining undersides 111. Each said die therefore simultaneously defines both a first (upper) basal surface 15 of a fastener with associated islands 04 extending therefrom, and a second (under) basal surface 19 as well as the island undersides 10 of a fastener on a second side of said double-sided fastener.

In each type of apparatus 117 as described herein, said first and second dies also include other aspects common to industry including means for causing properly registered alignment, means for extracting extraneous material, means for ejecting products, means for heating and cooling, and other aspects common to industrial molding and die forming processes which are not claimed as part of the present invention.

As illustrated schematically in FIG. 15 an apparatus 117, being a simple reciprocating injection molding machine, is provided to first align and intermesh a set of said first and second dies 101, 102 by a known means for providing sequential pressure 139, and to secondly inject a moldable substance 128 into said interconnected cavities 103 by a known means for injecting such a substance under pressure. Said first and second dies may also include known means for introducing and distributing said substance, ejecting air, cooling, and ejecting said product. After said substance is sufficiently hardened, said first and second dies are disengaged by said reciprocating apparatus and said product is ejected by same.

A reciprocating cutting/forming press apparatus 117 is illustrated in FIG. 16. Herein said first 101 and second 102 dies are aligned and intermeshed under pressure so as to form a product 118 out of a malleable sheet material 131 such as sheet metal, paper, or formable plastic. In this instance, one of said first and second dies includes surface segments having a plurality of cutting edges 122 and the other of said first and second dies includes surface segments having a plurality of anvil portions 123 so that said product includes a plurality of cut edges 124, at least some of said cut edges being adjacent to said undersides 10 of said product, and at least some others of said cut edges being adjacent to said perforations 03. Such an apparatus, and said dies may also include means for ejecting excess material such as the ejection slots 115 illustrated in FIG. 12. Said reciprocating press may include mechanisms to assure alignment, provide sequential application of pressure, provide for sequential movement of product, as well as other aspects known to the forming industry. Such a reciprocating cutting/forming press may be designed to provide a sequential (row by row) forming operation as schematically illustrated here or to provide multiple row forming of relatively larger fastener sheets, depending on material used and design criteria. Material may be supplied into such an apparatus or other forming apparatus as individual sheets 131 or from a coil 131'.

FIG. 17 schematically illustrates a rotating cutting/forming press apparatus 117 having pluralities of said first and second dies 101, 102 arrayed on the surfaces of a set of counter-rotating rollers 129, 130 so that, as a malleable sheet material 131 is inserted between said rollers, it will be continuously formed into a continuous length of fastener product 132, Said malleable material 131 may be provided sequentially in sheet form or continuously in a coil form 131' as illustrated. Said product 132 is then extruded from said rollers in a continuing fashion and may be cut into useable sizes or otherwise modified by subsequent processes known to industry.

A continuous molding apparatus 117 is schematically illustrated in FIG. 18, wherein said first and second dies 101, 102 are arrayed on the surfaces of a set of rotating molds 133, 134. A flowable molding substance 128 such as thermoplastic resin is inserted through a nip 135 under sufficient pressure to completely fill interconnected cavities 103 as defined by said interengaging dies. Said apparatus includes means for cooling said material as is common to the industry so that said product 110 may be sequentially stripped from the molds as it hardens. An important aspect of such an apparatus is that said interfacing gates of the parallel type 113 serve to define the relative disposition of said first and second molds 133, 134 thereby precisely defining the thickness of said fenestrated base structure 02 as well as individual elements of said product.

At least one of said rotating molds 133,134 may optionally be provided in the form of a continuous molding belt 135. This option may be included in order to expedite the production process by providing a longer mold contact time for cooling prior to product ejection, thereby allowing said rotating molds to operate at a faster speed.

Optionally, a fabric or other reinforcing material 48 may be integrally molded into said product for the purpose of reinforcing, providing selvage for sewing, or other purpose. Said reinforcing material 48 is temporarily adhered to the peripheral surface of one of said first or second counter rotating molds 133 so that said material is caused to pass through said apparatus as said moldable substance 128 fills said interconnected cavities 103, thence becoming integrally molded with said product. Such a reinforcing material 48 which has perforations which can align with protruding elements of said first or second dies 102 can be caused to substantially attach to said protruding elements prior to the introduction of said substance 128, thereby aligning and registering said substrate 136 with said interconnected cavities 103 between said perforations 109.

Figure 19:
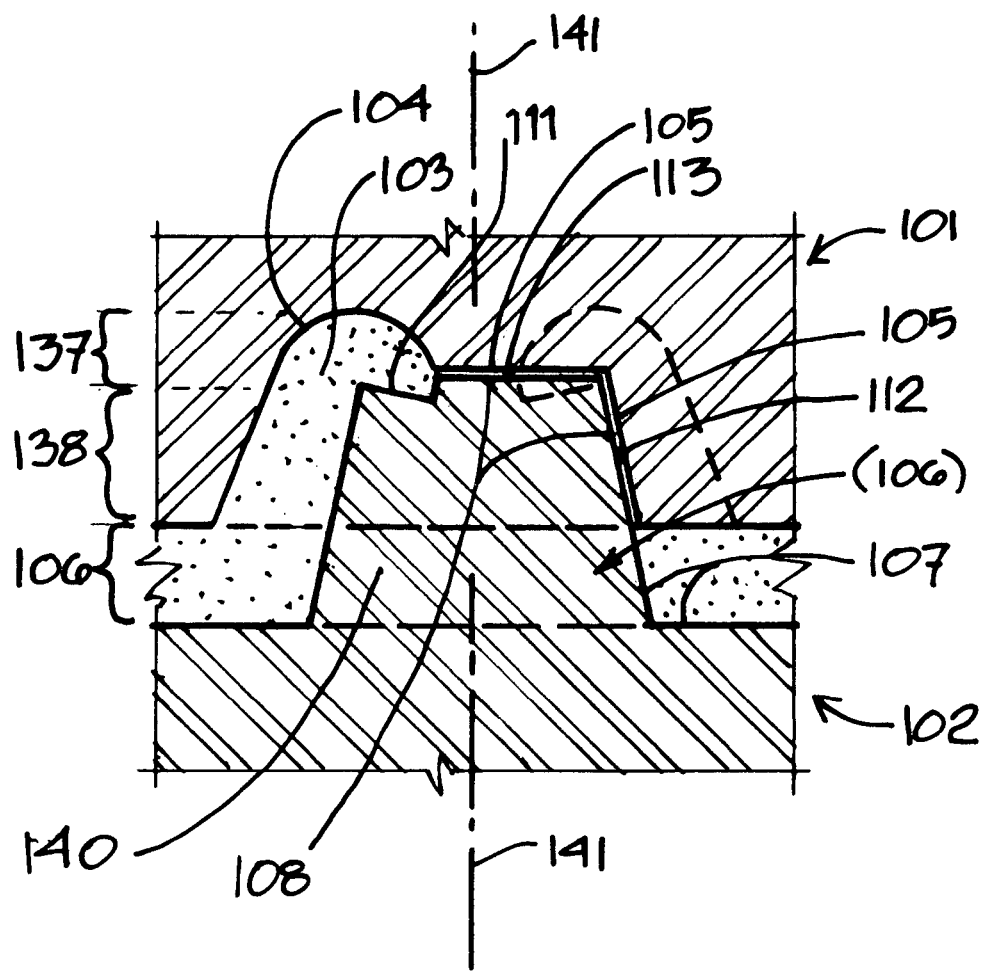

FIG. 19 schematically illustrates in cross section segments of the first and second bypassing dies of the present apparatus configured for molding a hook portion for engaging with a loop portion or with a second similar portion, either as a stand-alone product or as an integral zone within a molded component. The first die 101 includes cavity 103 with a cavity opening, cavity end, cavity walls 104, and interfacing walls 105 to provide gates. The second die 102 includes a core 140 corresponding to cavity 103 with a core end, interfacing walls 108 to provide gates, cavity walls 107 generally parallel with the molding axis 141, and cavity walls 111 generally perpendicular to that axis. When the first and second dies are engaged along the molding axis 141, the core 140 partially bypasses the cavity opening and interfaces with the cavity end and interfacing walls 105 so as to effect a segmented gate with a common cavity 106 continuing around the blocked-out region defined by the core base, and a plurality of stem chambers 138 extending away from the common cavity, each defined by cavity walls 104 and 107 of the first and second dies respectively and partitioned from adjacent stem chambers by gates 112 generally parallel to the axis at the bypassing segments of the dies. Each stem cavity extends away from the common cavity 106 to a terminal chamber 137 defined by cavity walls 104 of the first die and by cavity wall 111 of the second die projecting generally laterally over a portion of the core end. Thus, the resultant contiguous cavity includes the generally planar common cavity 106 (106) fenestrated by block-outs and a plurality of stem chambers 138 extending away from the common cavity to terminal chambers 137 with undersides 111 terminating over the block-outs. Therefore, filling the cavity by the means previously described with a moldable material, allowing the material to cure as necessary, and ejecting the resultant product results in a product comprising a fenestrated base structure with a plurality of undercut stems extending away from the base to undercut ends which project over each fenestration, so as to effect a hook portion for engaging with a loop portion or for self-engaging with a similar portion.

It is to be understood that the forgoing description and associated drawings are intended to schematically demonstrate a wide range of embodiments which may be produced by the method described or by other methods. It is the intent of these documents to describe a range of variations which may be modified or combined in diverse ways within the scope of this invention. It is further intended that all matters contained in the foregoing description or shown in the accompanying drawings shall be interpreted as schematically illustrative and not in a limiting sense. The following claims are intended to cover the generic and specific features of the invention herein described, and all statements of the scope of the invention which, as a matter of language, might be said to fall therebetween.

Having thus described the invention, I hereby claim the following:

1. An apparatus for producing a structure which includes a plurality of stems, each stem contiguous with at least two undercut segments spaced away from and overhanging the adjacent fenestrations of a common fenestrated base, with a plurality of said stems associated with each fenestration, said apparatus comprising:
   a molding axis;
   a first die including at least one first cavity with
      a cavity opening, a cavity end generally perpendicular to said axis,
      a plurality of first cavity walls, and a plurality of first interfacing walls;
   a second die including at least one core correspondent to said first cavity with a core end generally perpendicular to said axis, a plurality of second cavity walls, and a plurality of second interfacing walls;

and means for engaging said first die with said second die to produce a product of a moldable material inserted therebetween;

said first die and said second die configured so that when they are engaged along said axis, a segment of said core partially bypasses said cavity opening so that said first interfacing walls and said cavity end respectively interface with said second interfacing walls and said core end to effect a segmented gate partially divided by stem chambers, each said stem chamber enclosed by portions of said first and said second cavity walls and extending to a terminal chamber also enclosed by said first and said second cavity walls with an underside coincident with a segment of said second cavity walls on said core end, so as to effect a common cavity with at least one block-out and a plurality of contiguous stem chambers extending away from said common cavity at the edge of said block-out, each said stem chamber extending to a terminal chamber with an underside extending over said block-out; and wherein said first and second die cavities are configured to form said structure;

thereby, filling said cavity with said moldable material and engaging said dies by said means produces said structure.

2. An apparatus according to claim 1, wherein said means for engaging said first and second dies comprises a reciprocating injection molding machine and said moldable material is a plastic resin; thereby injection molding said product.

3. An apparatus according to claim 1, wherein said first die is a segment of a larger third die and said second die is a segment of a larger fourth die, said third die and said fourth die for producing a product having at least one segment with stems extending therefrom to undercut ends projecting over fenestrations therein corresponding with said first and said second dies; thereby integrally molding said structure with undercut segments and stems within a larger molded structure.

4. An apparatus according to claim 1, wherein said first die includes at least three adjacent said cavities and said second die includes at least three adjacent said cores, wherein each said stem chamber is also partially enclosed by the cavity walls of each adjacent said core, and each said stem chamber extends to a terminal chamber having undersides generally coincident with the core ends of each adjacent said core so that each said terminal chamber communicates with the cavity of a subsequent row of said dies; thereby producing an embodiment of said structure with a stepped longitudinal profile, whereby a unidirectional slidingly engaging fastener portion is produced.

5. An apparatus according to claim 1 wherein said first die also includes at least one core segment and said second die also includes at least one cavity segment corresponding to said core segment, so that engaging said dies along said axis by said means effects a contiguous cavity comprising a generally planar fenestrated common cavity with a plurality of stem chambers extending away from each surface thereof to a plurality of corresponding undercut terminal chambers each projecting over a said block-out region of said common cavity; thereby, upon filling said cavity with said material, curing said material, and ejecting said product, producing a double-sided embodiment of said structure with a plurality of stems with associated undercut segments extending from each of two opposite surfaces thereof.

6. A method for producing a structure which includes a plurality of stems, each stem contiguous with at least two undercut segments spaced away from and overhanging the adjacent fenestrations of a common fenestrated base, with a plurality of said stems associated with each fenestration, said method comprising:
  a. providing an apparatus in accordance with claim 1;
  b. engaging said first and said second dies by said means to define a cavity comprising a common cavity with at least one block-out corresponding to the base of said at least one core, and a plurality of stem chambers surrounding said core each extending away from said common cavity to a terminal chamber with an underside projecting over a portion of said block-out so that said cavity is configured to form said structure;
  c. inserting said moldable material into said cavity by said means for engaging and producing;
  d. curing said material as required for molding such material; and
  e. ejecting the resultant product from said apparatus, thereby producing said structure.

7. A method for producing a slidingly engaging fastener portion which includes a plurality of stems, each stem contiguous with at least two undercut segments spaced away from and overhanging the adjacent fenestrations of a common fenestrated base, with a plurality of said stems associated with each fenestration, said method comprising:
  a. providing an apparatus according to claim 1;
  b. engaging said first and said second dies by said means to define a cavity comprising a common cavity with at least one block-out corresponding to the base of said at least one core, and a plurality of stem chambers surrounding said core each extending away from said common cavity to a terminal chamber with an underside projecting over a portion of said block-out so that said first and second die cavities are configured to form said slidingly engaging fastener portion;
  c. inserting said moldable material into said cavity by said means for engaging and producing;
  d. curing said material as required for molding such material so as to produce said fastener portion; and
  e. ejecting the resultant product from said apparatus.

8. A method for producing a self-engaging fastener portion including a plurality of stems, each stem contiguous with at least two undercut segments spaced away from and overhanging the adjacent fenestrations of a common fenestrated base, with a plurality of said stems associated with each fenestration, said method comprising:
  a. providing an apparatus according to claim 1;
  b. engaging said first and said second dies by said means to define a cavity comprising a common cavity with at least one block-out corresponding to the base of said at least one core, and a plurality of stem chambers surrounding said core each extending away from said common cavity to a terminal chamber with a segmented underside projecting over a portion of said block-out, whereby said common cavity defines said fastener portion;
  c. inserting said moldable material into said cavity by said means for engaging and producing;
  d. curing said material as required for molding such material; and
  e. ejecting the resultant product from said apparatus, thereby producing said self-engaging fastener portion.

9. An apparatus in accordance with claim 1, wherein each said terminal chamber is contiguous with at least one adjacent said terminal chamber, thereby producing a structure with segmented undercut segments.

10. An apparatus according to claim 1,
wherein said structure includes a plurality of said undercut segments contiguous with each singular stem.

11. An apparatus according to claim 1,
wherein said structure includes sets of said undercut segments interspersed between sets of said stems, whereby effecting a plurality of segmented islands.

12. An apparatus according to claim 1,
wherein the base, stems and undercut segments of said structure are generally uniform in thickness.

13. An apparatus according to claim 1,
wherein said undercut segments are configured to provide a unidirectionally engaging fastening portion.

14. An apparatus according to claim 1,
wherein said undercut segments are configured to provide a multi-directionally engaging fastener portion.

15. An apparatus according to claim 1,
wherein at least a portion of at least one of said core end and said cavity end is oblique to said axis.

16. An apparatus for producing a structure,
said structure having a plurality of undercut segments overhanging each of a plurality of fenestrations, each fenestration bounded at least in part by at least one stem projecting from a fenestrated common base to a plurality of said undercut segments, wherein each said stem is associated with multiple undercut segments and with multiple fenestrations and wherein said stems and undercut segments are configured to receive and fasten, with another portion of said structure;
said apparatus comprising:
a molding axis;
a first die including at least one cavity;
a second die including at least two core segments;
means for engaging said first and second dies to produce a product;
said first and second dies configured so that engaging said dies along said axis effects a contiguous cavity comprising a generally planar common cavity surrounding each said core and a plurality of stem cavities adjacent to each said core each extending away from said common cavity to a terminal chamber with at least one underside generally perpendicular to said axis extending over a surface segment of said core; and wherein said first and second die cavities are configured to form said structure;
thereby, filling said cavity with a moldable material by said means produces said structure comprising a plurality of undercut stems with undersides extending over each fenestration of a common fenestrated base.

17. An apparatus for molding a structure that includes a base having a plurality of fenestrations and further includes a plurality of islands integral with the base, each of the plurality of islands having a plurality of undercut segments overhanging each adjacent fenestration, said apparatus comprising:
a first die according to claim 16 having a molding axis and a plurality of gates each defining a corresponding one of the fenestrations and at least a portion of one of the plurality of undercut segments, each of said plurality of gates having a contact surface substantially perpendicular to said first molding axis;
a second die according to claim 16 having a plurality of contact regions each for engaging a corresponding one of said plurality of gates at said first surface; and
a mechanism for engaging said first die and said second die with one another substantially along said molding axis such that said contact surface of said first die engages said contact region of said second die.

18. A method of molding a structure, said structure having a plurality of undercut segments overhanging each of a plurality of fenestrations, each fenestration bounded at least in part by at least one stem projecting from a fenestrated common base to a plurality of said undercut segments, wherein each said stem is associated with multiple undercut segments and with multiple fenestrations and wherein said stems and undercut segments are configured to receive and fasten with another portion of said structure; said method comprising the steps of:
providing an apparatus according to claim 16 and
engaging said first die and said second die with one another substantially along said molding axis such that a contact surface of said first die engages with a contact region of said second die so that the common cavity defined by said first and second dies is configured to form said structure;
inserting and hardening said moldable material;
and disengaging said dies to extract said structure.

19. An apparatus in accordance with claim 16, wherein each said terminal chamber is contiguous with at least one adjacent said terminal chamber, thereby producing a structure with segmented undercut segments.

20. An apparatus according to claim 16,
wherein, said structure includes at least one stem with undercut segments extending away from the fenestrated base in a first direction and at least one stem with undercut segments extending away from the fenestrated base in a second direction, opposite said first direction;
and wherein said first die also includes core segments and said second die also includes at least one cavity;
whereby a double-sided fastening portion is produced.

21. An apparatus according to claim 16,
wherein each singular stem of said structure is contiguous with multiple undercut segments.

22. An apparatus according to claim 16,
wherein each singular stem of said structure is located between two undercut segments and is distinct from adjacent stems associated with each contiguous set of undercut segments.

23. An apparatus according to claim 16,
wherein said core segments are arrayed in rows, the terminal chambers of each said row of core segments extending in a generally planar direction perpendicular to said row of core segments into a portion of said common cavity associated with a subsequent row of core segments; whereby an embodiment of said structure with a stepped profile is produced.

24. An apparatus according to claim 16,
wherein at least a portion of at least one of said core end and said cavity end is oblique to said axis.

25. An apparatus for producing an integral fastening zone within a molded component, wherein said fastening zone includes at least two groups of associated undercut segments interspersed between multiple fenestrations, each said group having at least one stem and at least one undercut segment extending over each adjacent fenestration, and wherein each said group is contiguous with at least one said stem, and each said fenestration is associated with at least two said stems;
said apparatus comprising:
a first die including a common cavity defining said molded component also having at least two cavity openings, each with a cavity end, a plurality of first stem cavity walls, and a plurality of first gate walls;

a second die including at least two cores, each with a core end corresponding to each said cavity opening and cavity end, a plurality of second gate walls, a plurality of second stem cavity walls generally parallel with a molding axis, and a plurality of terminal chamber walls; and means for injecting and curing a moldable material and ejecting a resultant product;

said first and second dies configured so that when they are engaged along said molding axis each said core partially bypasses each said cavity opening, said first and second gate walls engage around a blocked-out region defined by each said core to effect a gate surrounded by said common cavity, and said first and second stem walls define at least one stem chamber extending away from said common cavity, continuing to a terminal chamber defined by said terminal chamber walls and at least a portion of said core end; and wherein said first and second die cavities are configured to form said integral fastening zone;

whereby, said resultant product comprises said molded component with said integral fastening zone.

26. A method for integrating a fastening zone within a molded component, wherein said fastening zone includes at least two groups of associated undercut segments interspersed between multiple fenestrations, each said group having at least one stem and at least one undercut segment extending over each adjacent fenestration, and wherein each said group is contiguous with at least one said stem, and each said fenestration is associated with at least two said stems; said method comprising the steps of:

a. incorporating the apparatus of claim 25 within an injection molding apparatus for producing said molded component so that said cavity is contiguous with a primary cavity for producing said molded component, and said cavity is configured to form said integral fastening zone;

b. engaging said apparatus along said axis;

c. injecting a moldable material into said cavity;

d. curing and ejecting the resultant product;

thereby producing said molded component including said integral fastening zone.

* * * * *